United States Patent …

(12) United States Patent
Geissele et al.

(10) Patent No.: US 11,774,206 B2
(45) Date of Patent: Oct. 3, 2023

(54) FIREARM MUZZLE BRAKE

(71) Applicant: WHG PROPERTIES, LLC, North Wales, PA (US)

(72) Inventors: William H. Geissele, Lower Gwynedd, PA (US); Ralph E. DiLemmo, Norristown, PA (US)

(73) Assignee: WHG PROPERTIES, LLC, North Wales, PA (US)

( * ) Notice: Subject to any disclaimer, the term of this patent is extended or adjusted under 35 U.S.C. 154(b) by 61 days.

(21) Appl. No.: 17/457,458

(22) Filed: Dec. 3, 2021

(65) Prior Publication Data

US 2023/0032661 A1   Feb. 2, 2023

Related U.S. Application Data

(63) Continuation-in-part of application No. 29/801,924, filed on Aug. 2, 2021.

(51) Int. Cl.
*F41A 21/36* (2006.01)
*B23C 3/16* (2006.01)

(52) U.S. Cl.
CPC ............... *F41A 21/36* (2013.01); *B23C 3/16* (2013.01)

(58) Field of Classification Search
CPC ................................. F41A 21/36; B23C 3/16
USPC ........................................................ 89/14.3
See application file for complete search history.

(56) References Cited

U.S. PATENT DOCUMENTS

| 4,545,285 A * | 10/1985 | McLain | F41A 21/36 |
| | | | 89/14.3 |
| 5,036,747 A * | 8/1991 | McClain, III | F41A 21/36 |
| | | | 89/14.3 |
| 2011/0174141 A1* | 7/2011 | Adolphsen | F41A 21/02 |
| | | | 89/14.3 |

(Continued)

FOREIGN PATENT DOCUMENTS

| WO | WO-2017171980 A2 * | 10/2017 | ............. F41A 21/28 |
| WO | WO-2021216240 A2 * | 10/2021 | ............. F41A 21/34 |

OTHER PUBLICATIONS

Precision Armament "M4-72 Severe-Duty® Compensator", retrieved from internet on Aug. 12, 2021 <https://precisionarmament.com/m4-72-severe-duty-compensator/> (10 pages).

(Continued)

*Primary Examiner* — Samir Abdosh
(74) *Attorney, Agent, or Firm* — Alston & Bird LLP

(57) ABSTRACT

Provided herein are muzzle brakes, firearms, and methods for manufacturing the same. A muzzle brake for attachment to a muzzle end of a firearm includes a body defining a first end that engages a muzzle end of the firearm, a second end opposite the first end, and an axis extending therebetween. The body further defines one or more openings intersecting the axis to form a channel extending between the first end and the second end along the axis. The body further defines a first port extending from the channel to an exterior surface of the body and a second port extending from the channel to the exterior surface of the body between the first port and the second end. In operation, the first port directs gas from the channel to an external environment of the muzzle brake that disrupts gas directed by the second port from the channel.

20 Claims, 15 Drawing Sheets

(56) References Cited

U.S. PATENT DOCUMENTS

| | | | | |
|---|---|---|---|---|
| 2011/0226121 | A1* | 9/2011 | Peterson | F41A 21/36 89/14.3 |
| 2013/0227871 | A1* | 9/2013 | Stone | F41A 21/30 42/76.1 |
| 2017/0191782 | A1* | 7/2017 | Bray | F41A 21/36 |
| 2020/0292269 | A1* | 9/2020 | Guillen | F41A 21/36 |
| 2021/0164748 | A1* | 6/2021 | Griffitts | F41A 21/36 |

OTHER PUBLICATIONS

Precision Armament—M4-72—Best-Valued-Muzzle-Brake—1024x683 [retrieved from internet on Aug. 12, 2021] (1 page) <https://www.rainierarms.com/wp/wp-content/uploads/2020/04/Precision-Armament-M4-72-Best-Valued-Muzzle-Brake-1024x683.jpg>.

APW—Raptor Muzzle Brake—Precision Shooting Store [https://www.precisionshooting.store/product/raptor-muzzle-brake/].

APW 4-port-raptor—600x600 [retrieved from Internet on Aug. 12, 2021] (1 page) <https://www.precisionshooting.store/wp-content/uploads/2020/09/4-port-raptor-600x600.jpg>.

Google muzzle brake image search [retrieved on Aug. 2, 2021] (1 page) <https://www.google.com/search?q=muzzle+brake&rlz=1C1GCEB_enUS853US853&sxsrf=ALeKk03dUf86g8z6u_qy2nulCLJfvu3AQA:1625841124973&source=lnms&tbm=isch&sa=X&ved=2ahUKEwj11duVmtbxAhWSFVkFHdDWCbsQ_AUoAnoECAEQBA&biw=1200&bih=1974>.

Rainier Arms, Best AR-15 Muzzle Devices [Hand-Tested 2020] posted on Apr. 13, 2020 by Richard Douglas (22 pages) <https://www.rainierarms.com/blog/best-ar-15-muzzle-devices-hand-tested-2020/>.

What Is the Most Effective Muzzle Brake Design?, Nov. 13, 2019, American Precision Arms (5 pages) <https://www.americanprecisionarms.com/blogs/info/what-is-the-most-effective-muzzle-brake-design>.

American Precision Arms Gen 2 Fat Bastard Self Timing Muzzle Brake <https://www.americanprecisionarms.com/products/gen2-fat-bastard>.

American Precision Arms Gen 2 Fat Bastard Self Timing Muzzle Brake [retrieved from Internet on Aug. 12, 2021] (1 page) <https://cdn.shopify.com/s/files/1/2253/6681/files/g2_fb_blog_large.jpg>.

American Precision Arms Gen 2 Fat Bastard Self Timing Muzzle Brake [ retrieved from Internet on Aug. 12, 2021] (1 page) https://cdn.shopify.com/s/files/1/2253/6681/products/DSC_4180_800x.jpg.

U.S. Appl. No. 29/801,924, filed Aug. 2, 2021, Not Published, Pending.

* cited by examiner

FIREARM MUZZLE BRAKE

CROSS-REFERENCE TO RELATED APPLICATIONS

This application claims priority to and is a continuation-in-part of U.S. application Ser. No. 29/801,924 filed Aug. 2, 2021, which application is hereby incorporated by reference in its entirety.

TECHNOLOGICAL FIELD

Example embodiments relate generally to firearms, and, more particularly, to muzzle brakes for use in firearms that counter recoil and/or muzzle rise, and associated assemblies, components, and methods regarding the same.

BACKGROUND

Tactical rifles and other types of firearms may be equipped with a barrel and bolt that, in conjunction, hold or support a cartridge during operation of the firearm (e.g., within a chamber). A magazine contains the cartridges that are fed from the magazine to the chamber during operational cycles. Actuation of the operational cycle of the firearm may be performed manually by an operator (e.g., a bolt action rifles) or by way of an autoloading action (e.g., automatic or semi-automatic rifles), such as by a high pressure propellant gas used to propel a projectile (e.g., a bullet of the cartridge).

The operational cycle of the firearm including the propelling of a projectile through the barrel may result in recoil (e.g., kick, knockback, etc.) as a rearward thrust towards an operator of the firearm. Additionally, the forces generated during the operational cycle may result in muzzle rise (e.g., muzzle flip, muzzle climb, etc.) where the muzzle end of the firearms tends to elevate. Muzzle brakes and/or recoil compensators attempt to counteract this recoil and/or muzzle rise by redirecting a portion of the high-pressure propellant gas received from the muzzle end of the firearm's barrel in one or more directions that counter these effects. However, muzzle brakes may also injure or cause discomfort to the firearm users (e.g., hearing damage). Through applied effort, ingenuity, and innovation, many of these identified problems have been solved by developing solutions that are included in embodiments of the present invention, many examples of which are described in detail herein.

BRIEF SUMMARY

The present disclosure relates generally to firearm muzzle brakes, assemblies and configurations that counter recoil and/or muzzle rise during a firearm's operational cycle. An example muzzle brake configured to attach to a muzzle end of a firearm may include a body defining a first end and a second end opposite the first end. The muzzle brake may be configured to engage the muzzle end of the firearm at or proximate the first end, and the first end and the second end may define an axis extending therebetween. The body may define one or more openings intersecting the axis to form a channel extending between the first end and the second end along the axis. The channel may be configured to receive a projectile from the firearm propelled therethrough by gas from a barrel of the firearm. The body may further define a first port extending from the channel to an exterior surface of the body and a second port extending from the channel to the exterior surface of the body where the second port is disposed between the first port and the second end. In operation, the first port may be configured to direct a first portion of the gas from the channel to an external environment of the muzzle brake that at least partially disrupts a second portion of the gas directed by the second port from the channel to the external environment of the muzzle brake.

In some embodiments, an angle at which the first portion of the gas exits the first port with respect to the axis and measured relative to the first end may be greater than an angle at which the second portion of the gas exits the second port with respect to the axis and measured relative to the first end.

In such an embodiment, the angle at which the first portion of the gas exits the first port may be substantially perpendicular with respect to the axis.

In other embodiments, the angle at which the first portion of the gas exits the first port with respect to the axis may greater than approximately 90 degrees.

In some further embodiments, the external surface of the body may define an at least partially cylindrical shape.

In some further embodiments, a cross-sectional area of the first port at the exterior surface of the muzzle brake may be smaller than a cross-sectional area of the second port at the exterior surface of the muzzle brake. In such an embodiment, the cross-sectional area of the first port and the second port at the exterior surface may define a respective width measured in a circumferential direction perpendicular to the axis and a respective length measured in a longitudinal and axial direction parallel to the axis, wherein the length of the first port is less than the length of the second port.

In some embodiments, the body may further include a third port defined between the second port and the second end. The third port may extend from the channel to the exterior surface of the body, wherein the first port may be further configured to direct the first portion of the gas from the channel to the external environment of the muzzle brake so as to at least partially disrupt a third portion of the gas directed by the third port from the channel to the external environment of the muzzle brake.

In some further embodiments, an angle at which the second portion of the gas exits the second port with respect to the axis may be substantially the same as an angle at which the third portion of the gas exits the third port with respect to the axis.

In other further embodiments, an angle at which the second portion of the gas exits the second port with respect to the axis may differ from an angle at which the third portion of the gas exits the third port with respect to the axis.

In some embodiments, the first port and the second port form a first set of ports, and the muzzle brake further includes a second set of ports. The second set of ports may include a fourth port extending from the channel to the exterior surface of the body, the fourth port axially aligned with the first port on an opposing side of an exterior surface of the muzzle brake, and a fifth port extending from the channel to the exterior surface of the body, the fifth port axially aligned with the second port on an opposing side of the exterior surface of the muzzle brake.

In some further embodiments, the fourth port may be configured to direct a fourth portion of the gas from the channel to the external environment of the muzzle brake that at least partially disrupts a fifth portion of the gas directed by the fifth port from the channel to the external environment of the muzzle brake.

In other embodiments, the first port and the second port form a first set of ports. The muzzle brake may further include a second set of ports including a fourth port extending from the channel to the exterior surface of the body and a fifth port extending from the channel to the exterior surface of the body. The muzzle brake may further include a third set of ports including a sixth port extending from the channel to the exterior surface of the body and a seventh port extending from the channel to the exterior surface of the body.

In such an embodiment, the fourth port may be configured to direct a fourth portion of the gas from the channel to the external environment of the muzzle brake that at least partially disrupts a fifth portion of the gas directed by the fifth port from the channel to the external environment of the muzzle brake, and the sixth port may be configured to direct a sixth portion of the gas from the channel to the external environment of the muzzle brake that at least partially disrupts a seventh portion of the gas directed by the seventh port from the channel to the external environment of the muzzle brake.

In some embodiments, at least a portion of a surface of the first port may define an angle with respect to the axis that is greater than an angle with respect to the axis defined by at least a portion of a surface of the second port.

In some embodiments, the body may define a distal surface of the first port from the first end defining a first angle with respect to the axis and a distal surface of the second port from the first end defining a second angle with respect to the axis, wherein the first angle may be greater than the second angle.

In such an embodiment, the first angle may be less than approximately 90 degrees with respect to the axis and measured relative to the first end.

The present disclosure further includes a firearm including a barrel assembly including a barrel including an inner surface defining a bore configured to guide a projectile as the projectile is propelled by pressurized gas. The barrel may define a muzzle end, a chamber end opposite the muzzle end, and the muzzle brake embodiments described herein attached to the barrel at the muzzle end. The present disclosure further includes methods of manufacturing the muzzle brake embodiments described herein.

A variety of additional aspects are also described in the following detailed description and in the attached claims. The aspects can relate to individual features and to combinations of features. It is to be understood that both the foregoing general description and the following detailed description are exemplary and explanatory only and are not restrictive of the broader inventive concepts upon which the example embodiments disclosed herein are based.

BRIEF DESCRIPTION OF THE DRAWINGS

Having thus described embodiments of the disclosure in general terms, reference will now be made to the accompanying drawings, which are not necessarily drawn to scale. The following drawings are illustrative of particular embodiments of the present disclosure and do not limit the scope of the present disclosure. Moreover, the drawings are intended for use in conjunction with the explanations provided herein. Example embodiments of the present disclosure will hereinafter be described in conjunction with the appended drawings.

Figure 1:
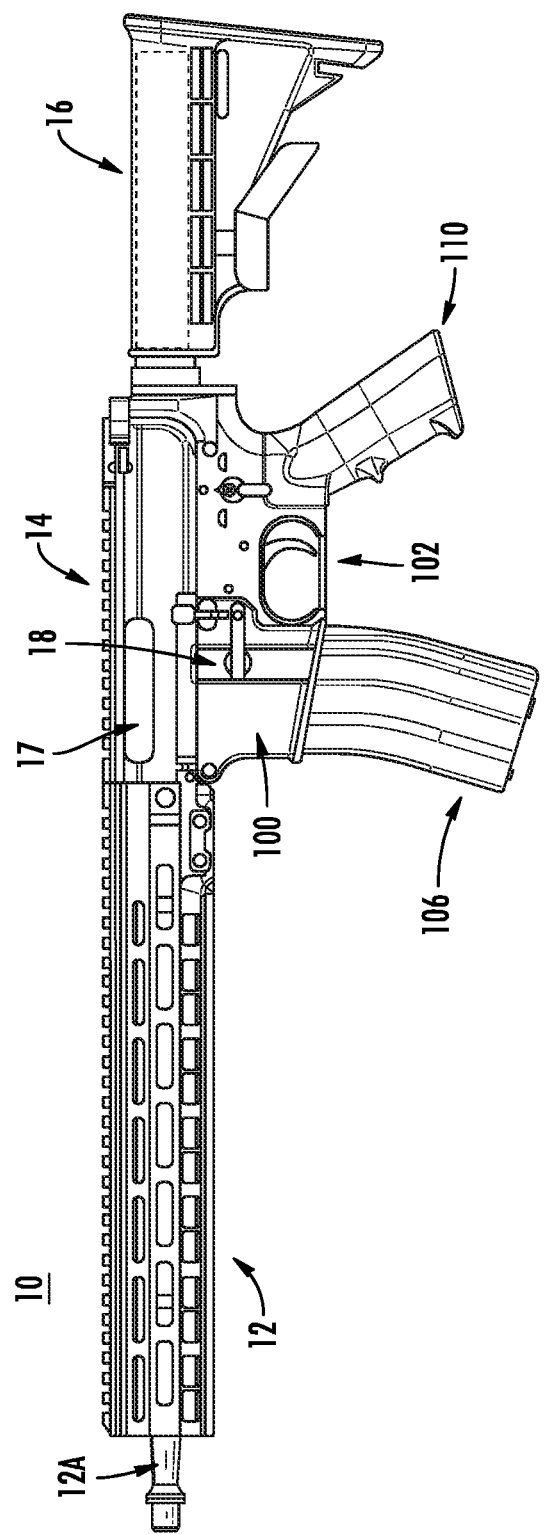
Figure 2:
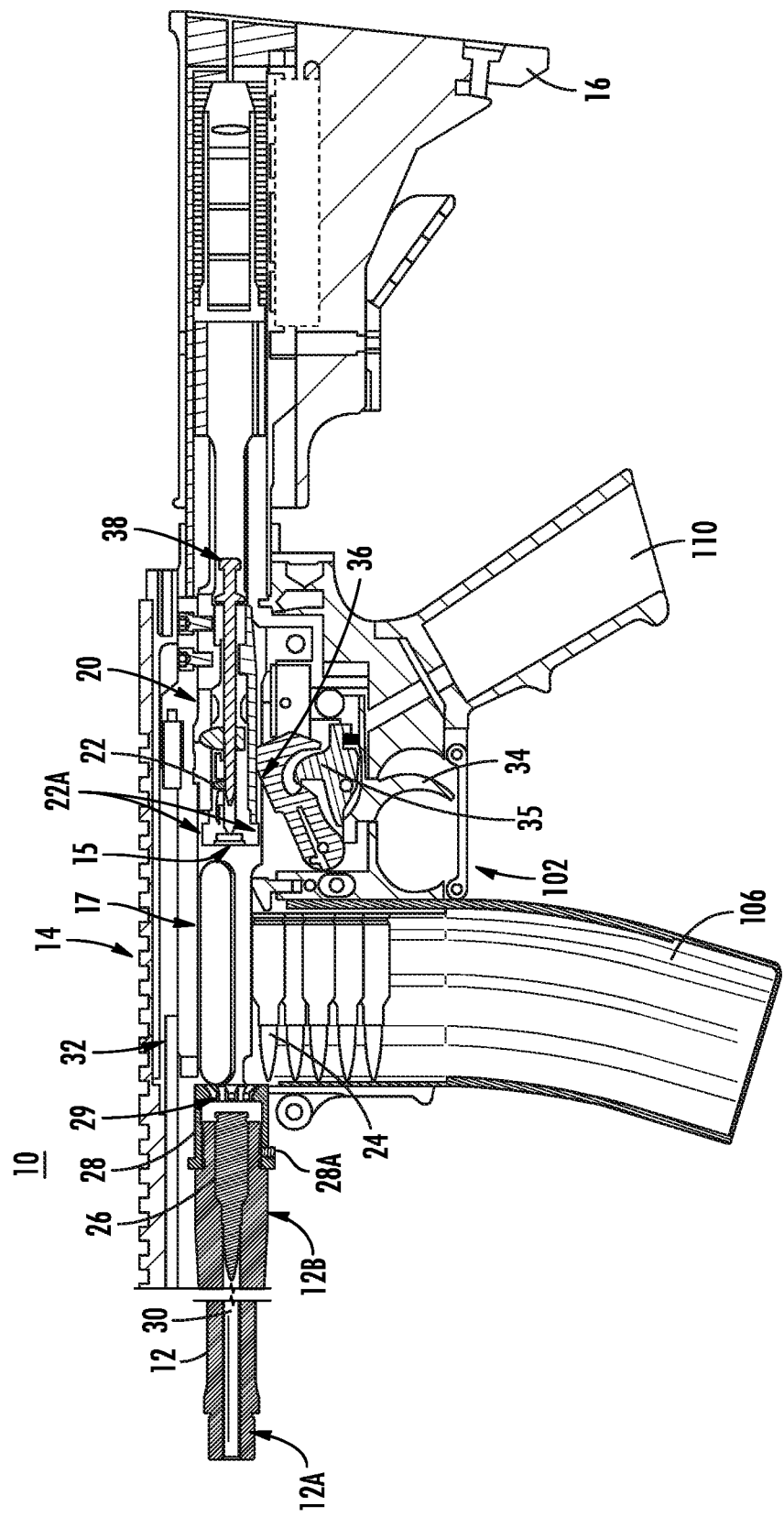
Figure 3:
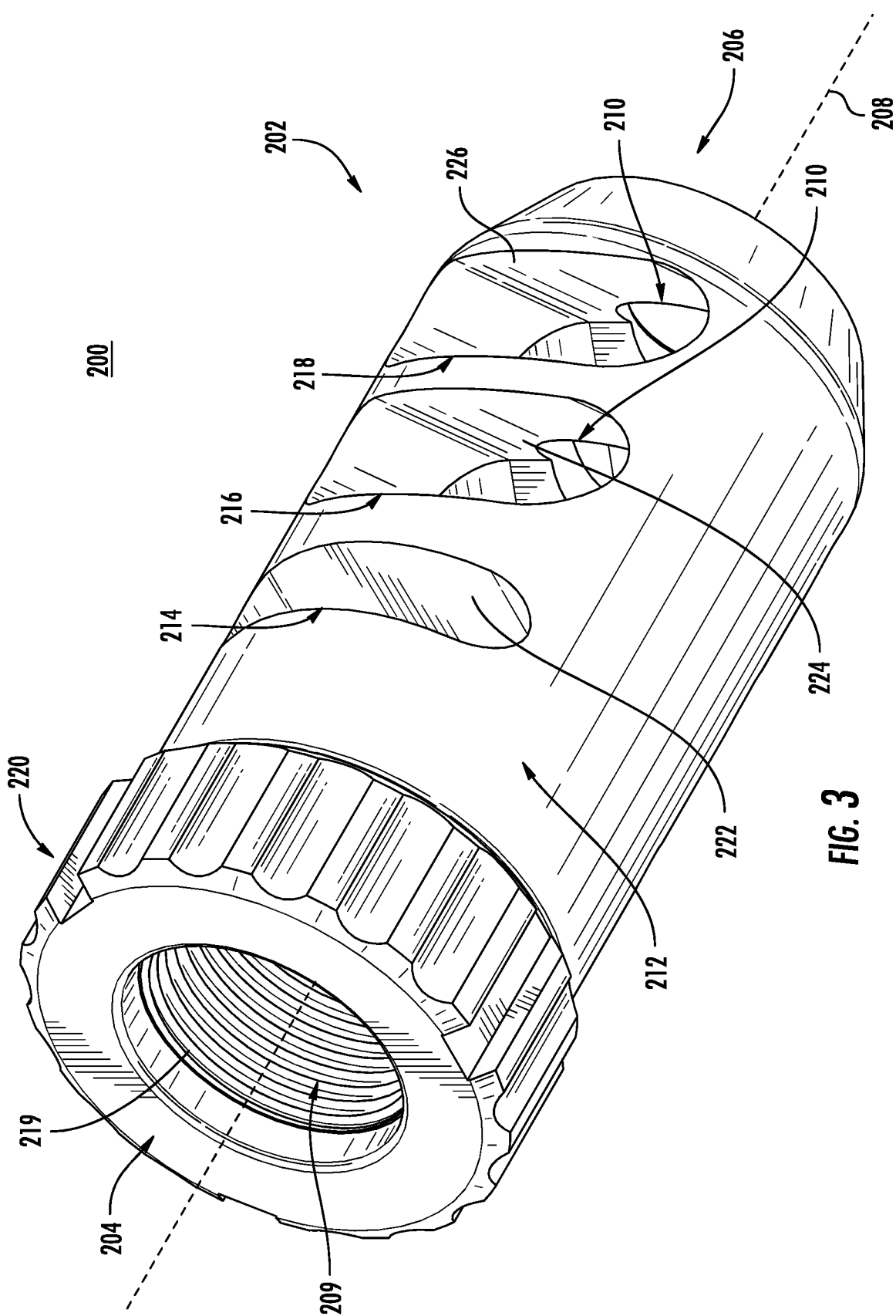
Figure 4:
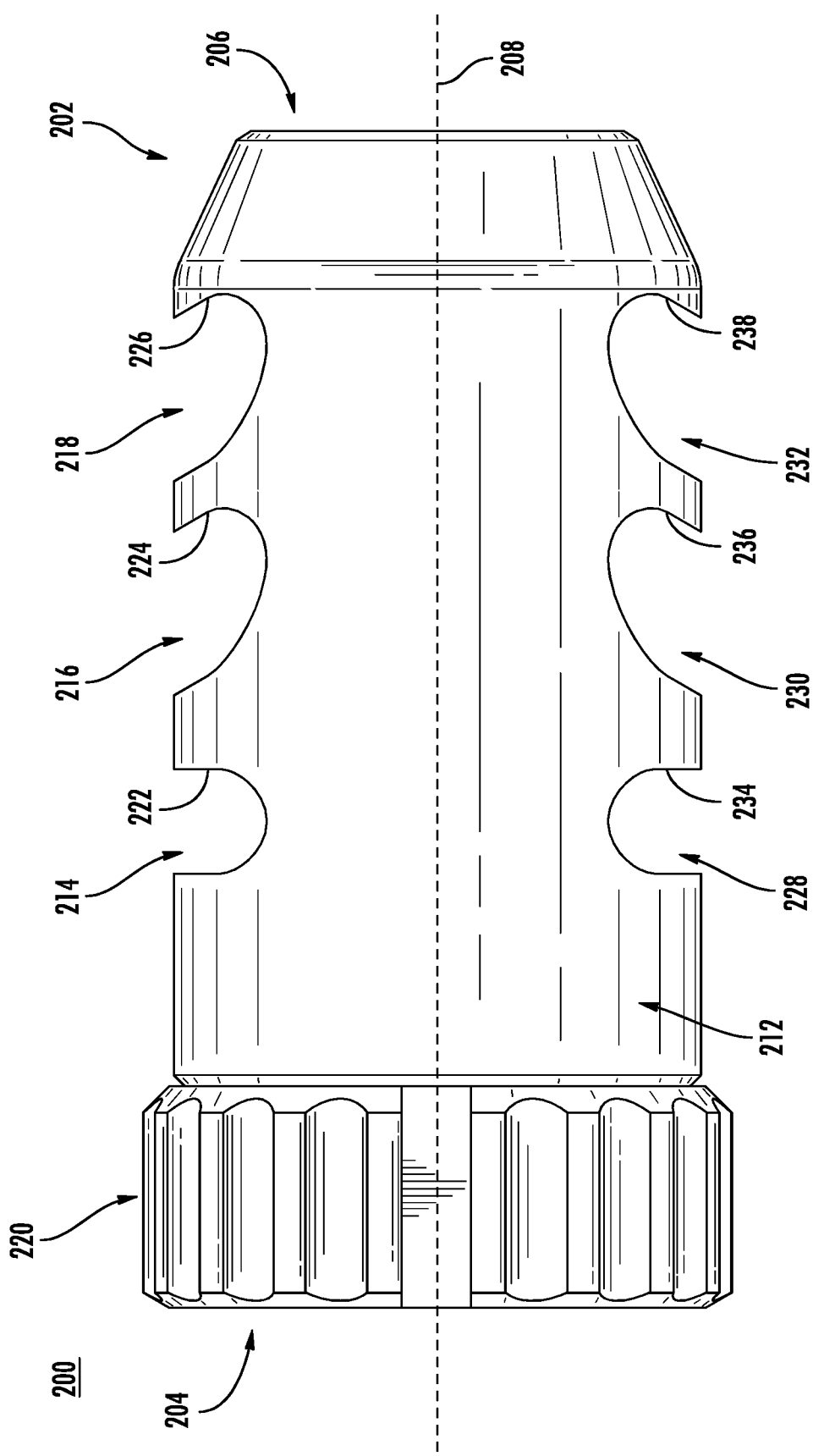
Figure 5:
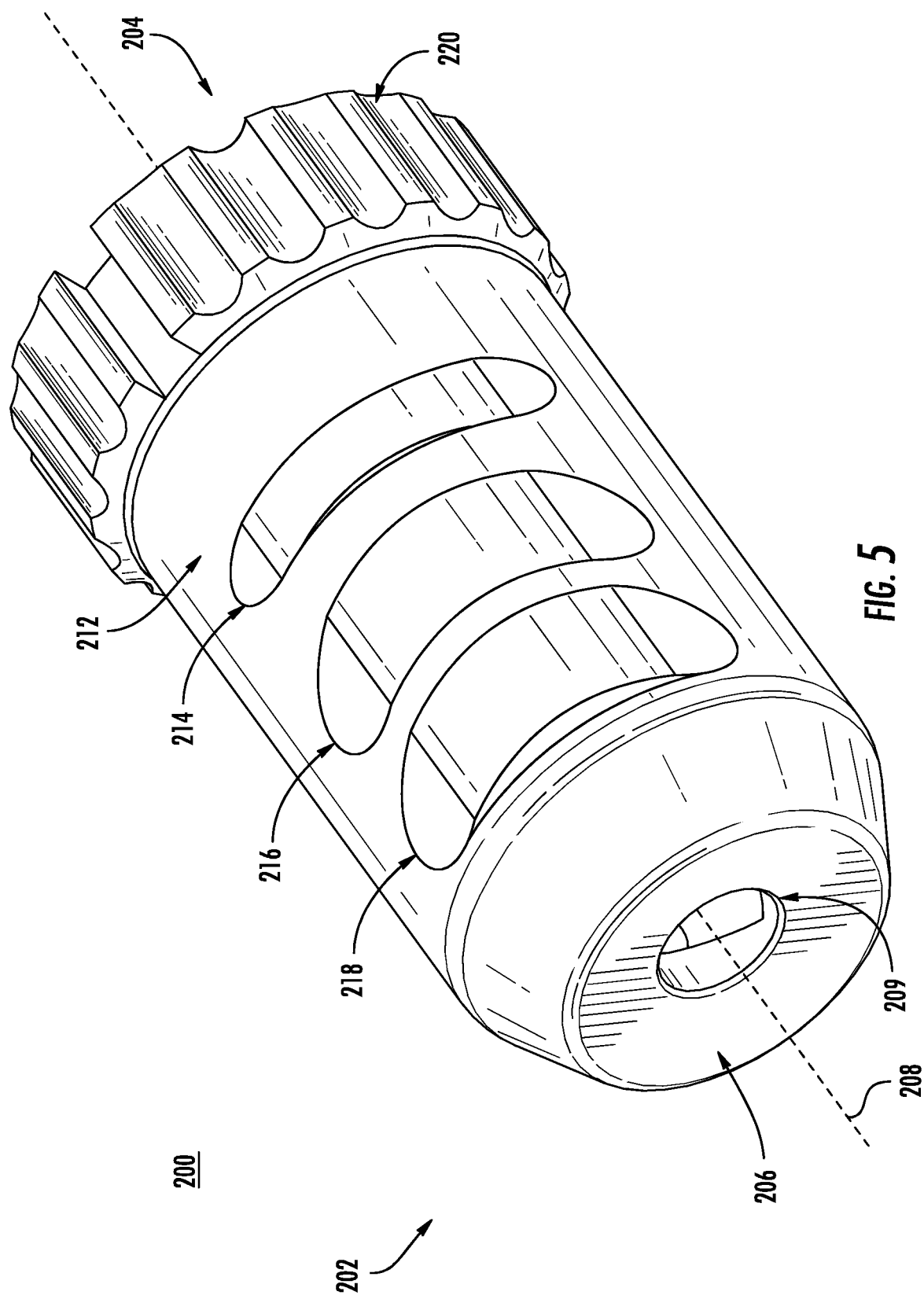
Figure 6:
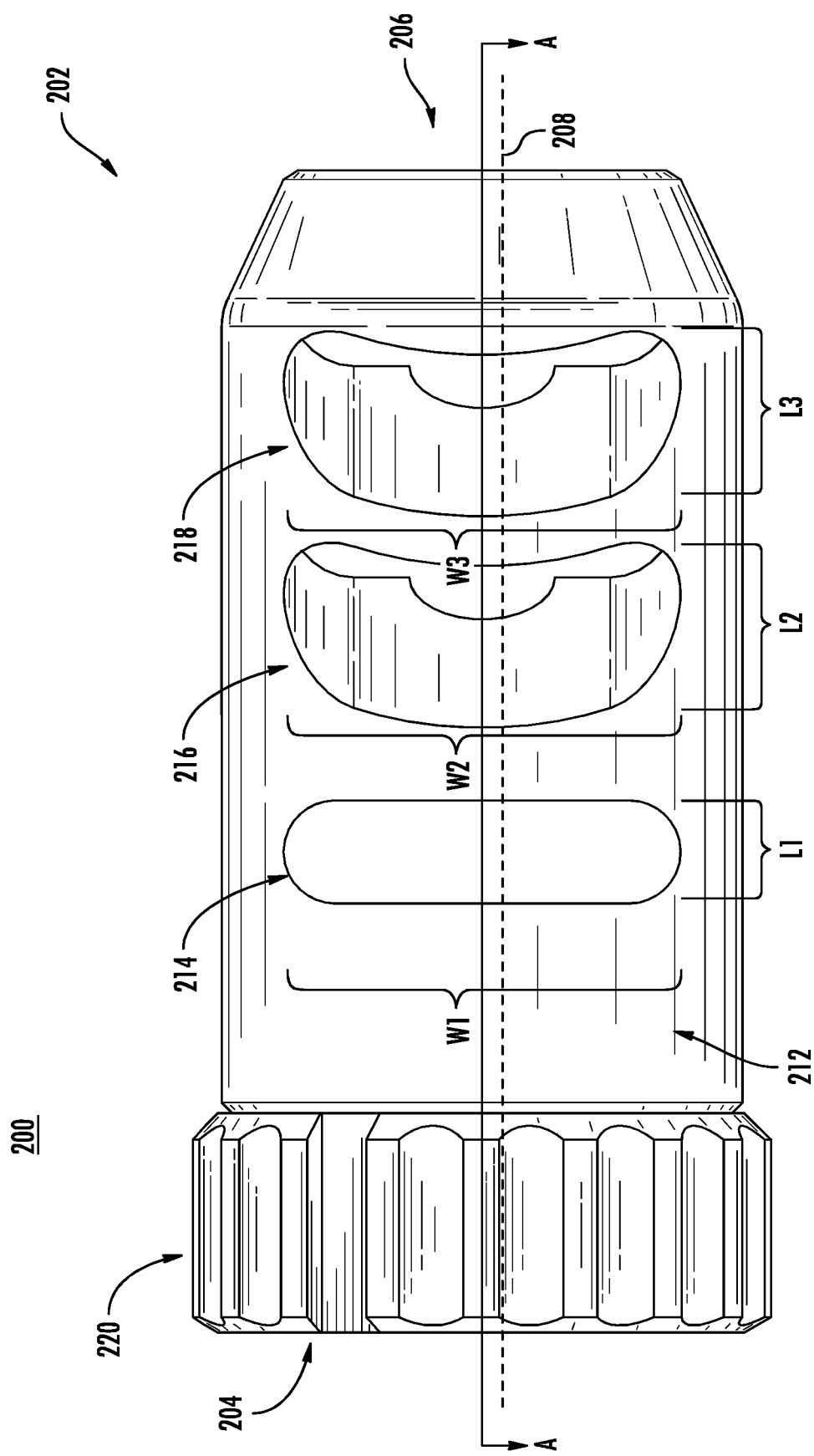
Figure 7:
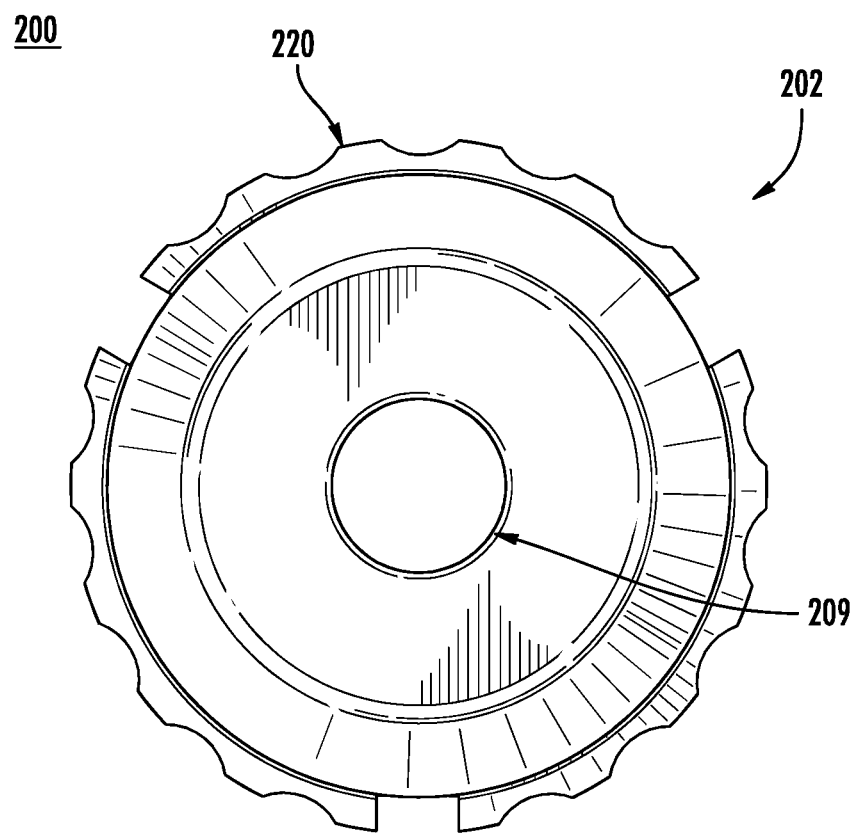
Figure 8:
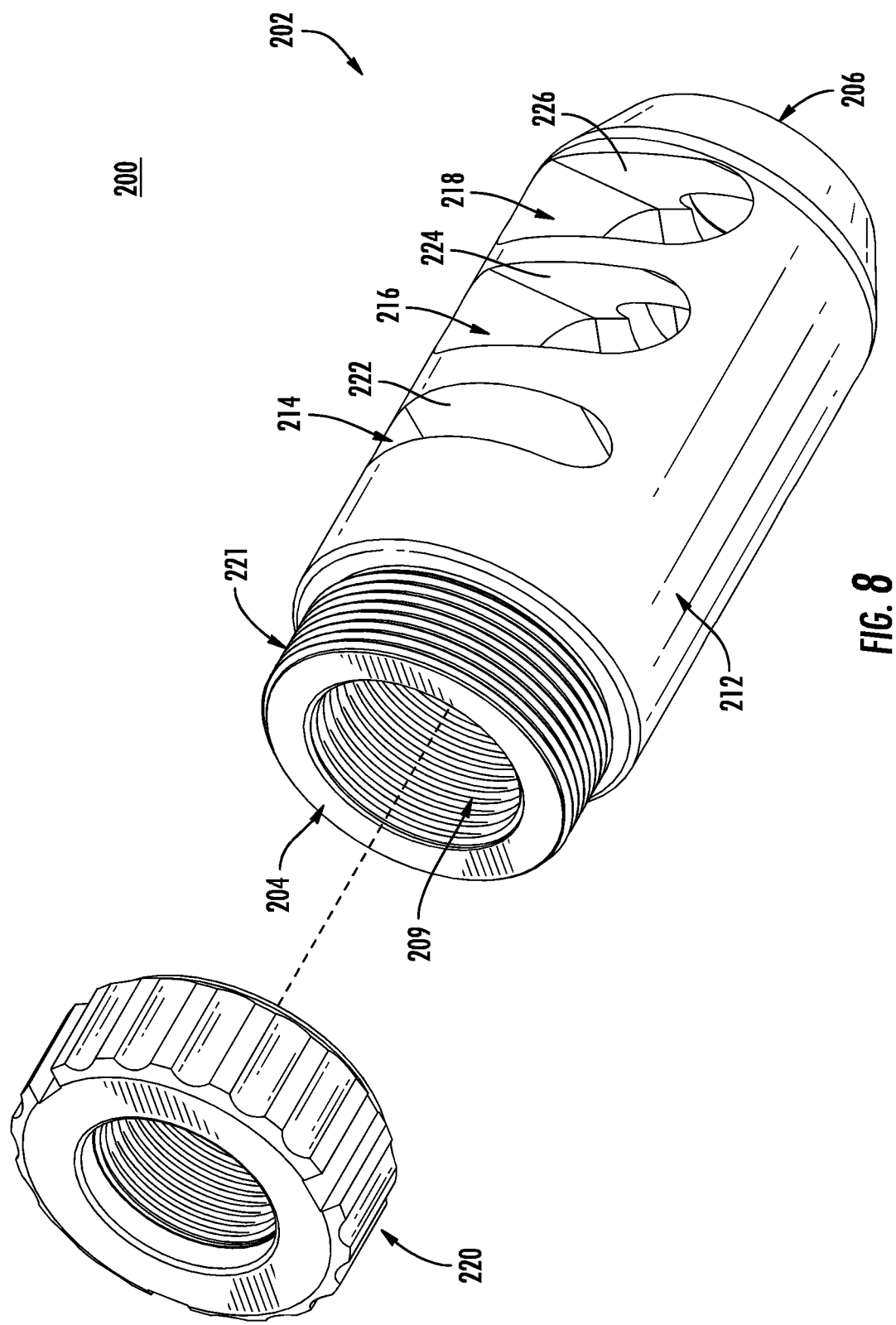
Figure 9:
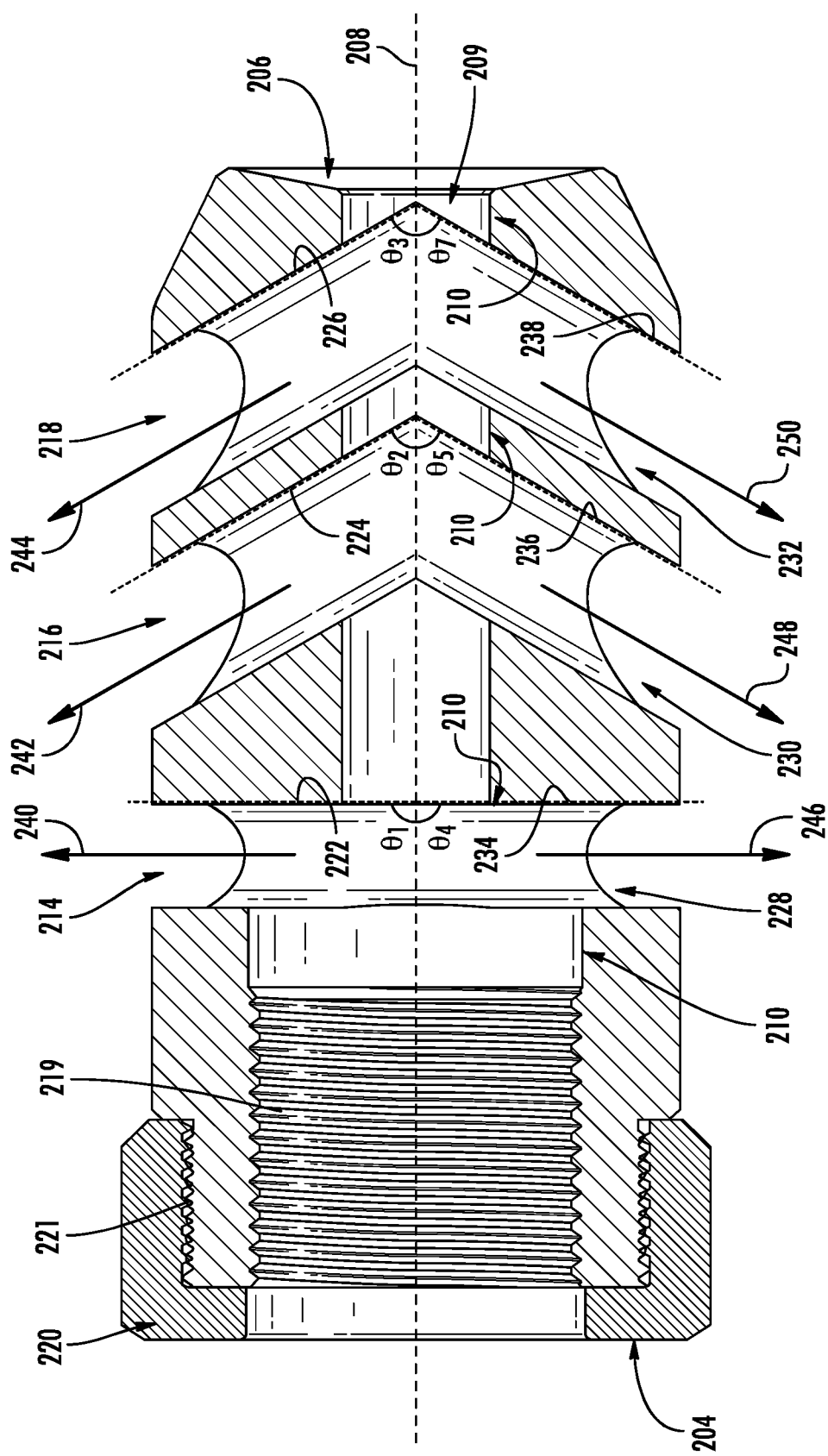
Figure 10:
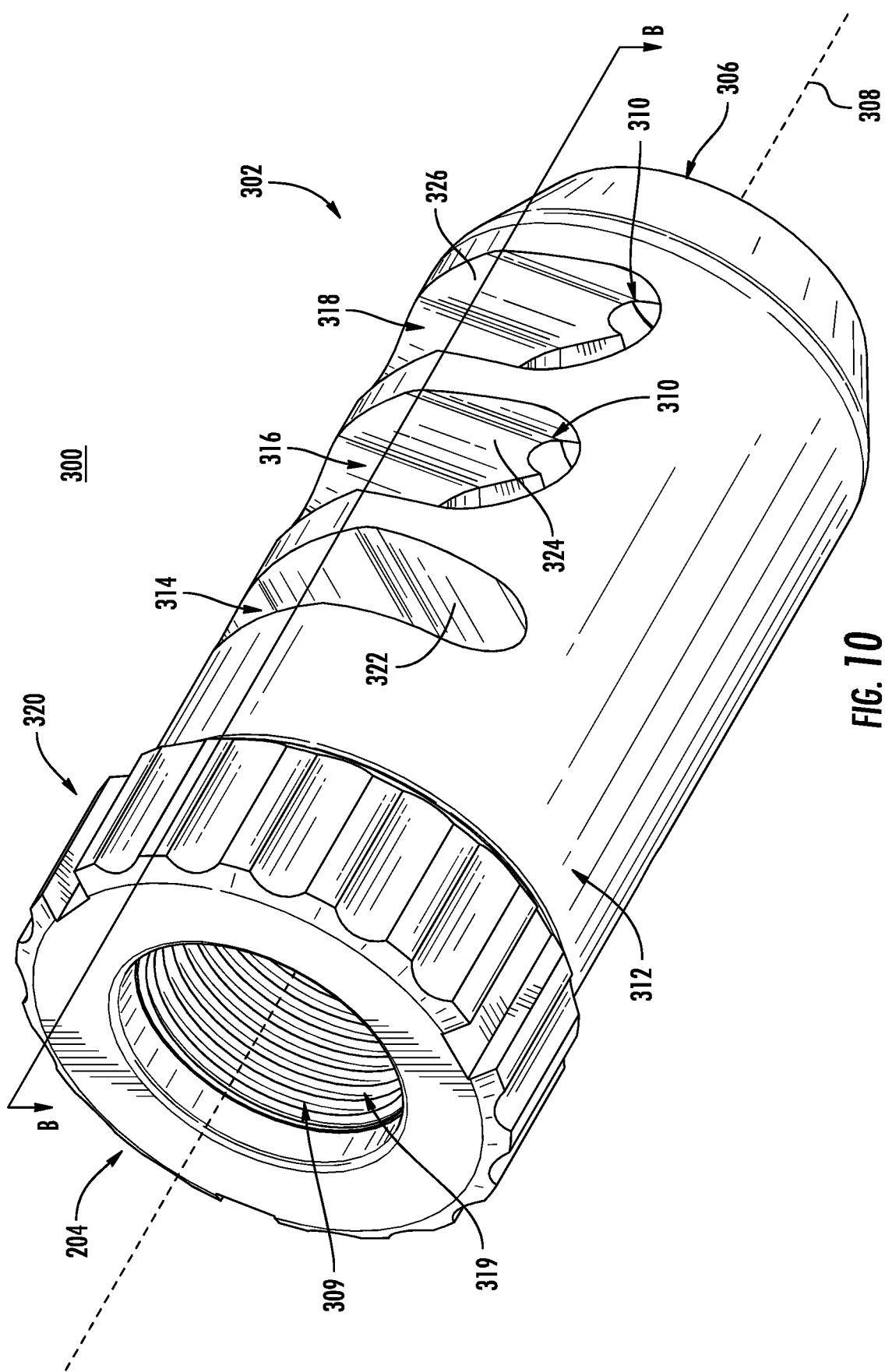
Figure 11:
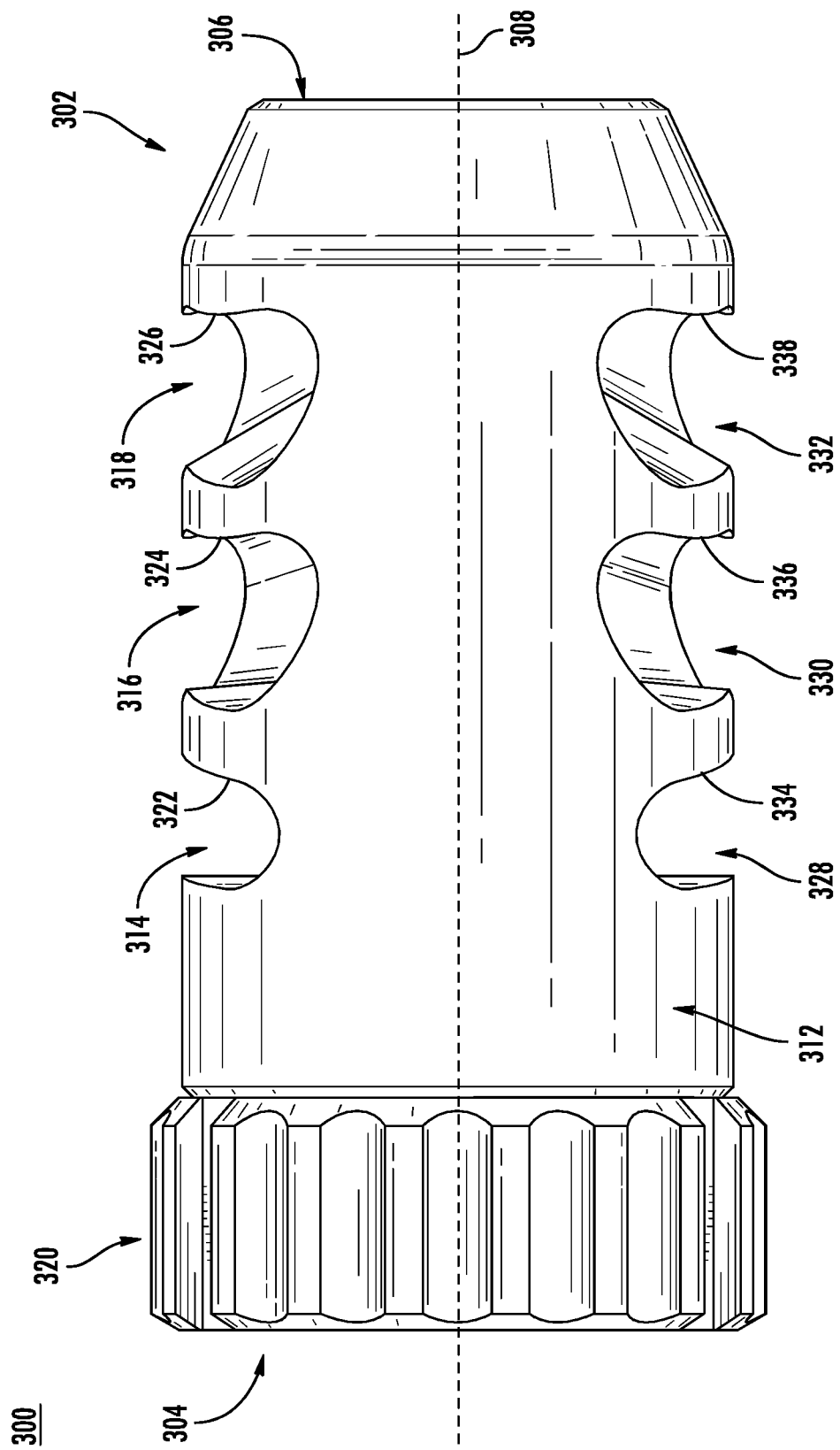
Figure 12:
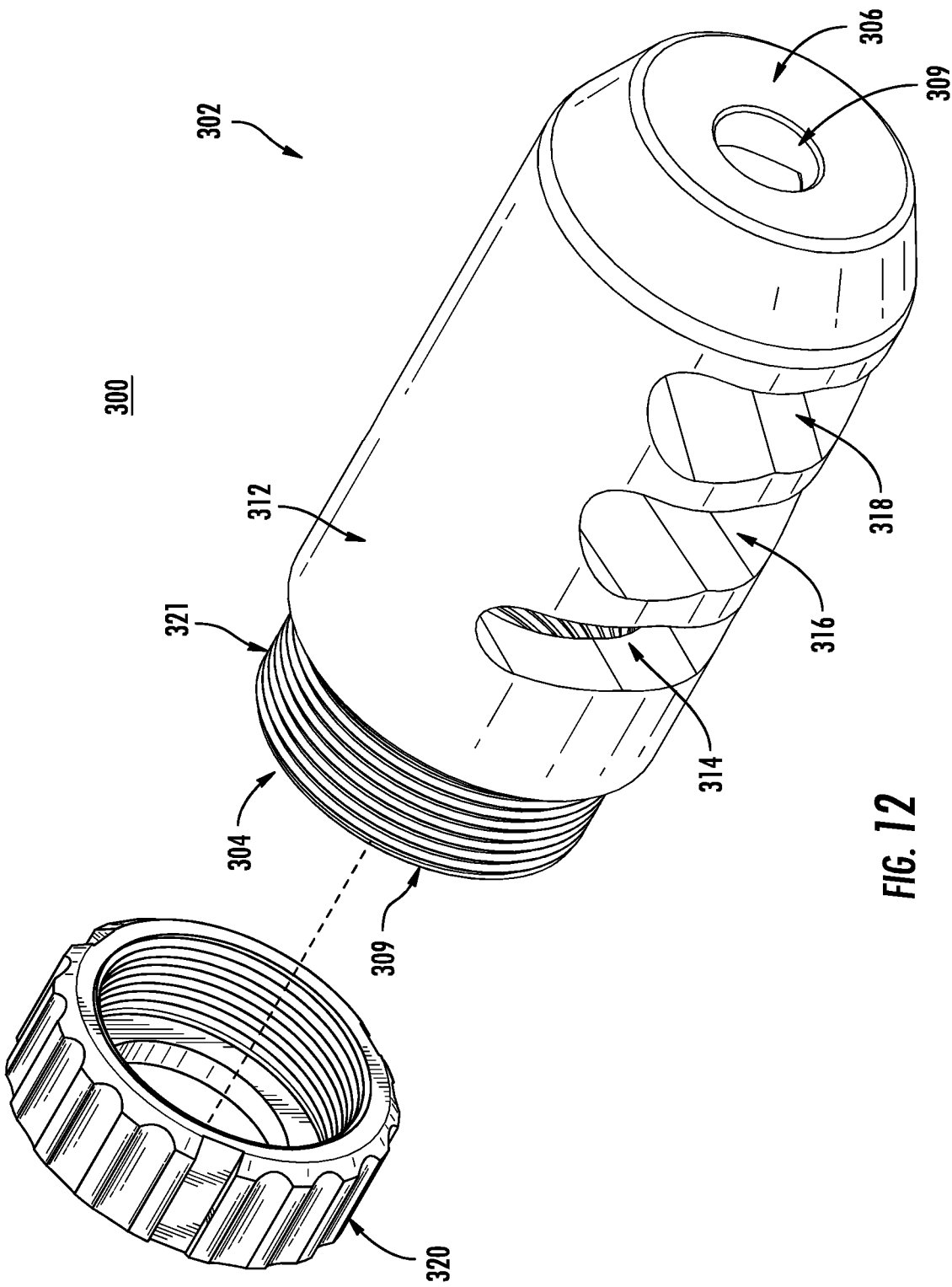
Figure 13:
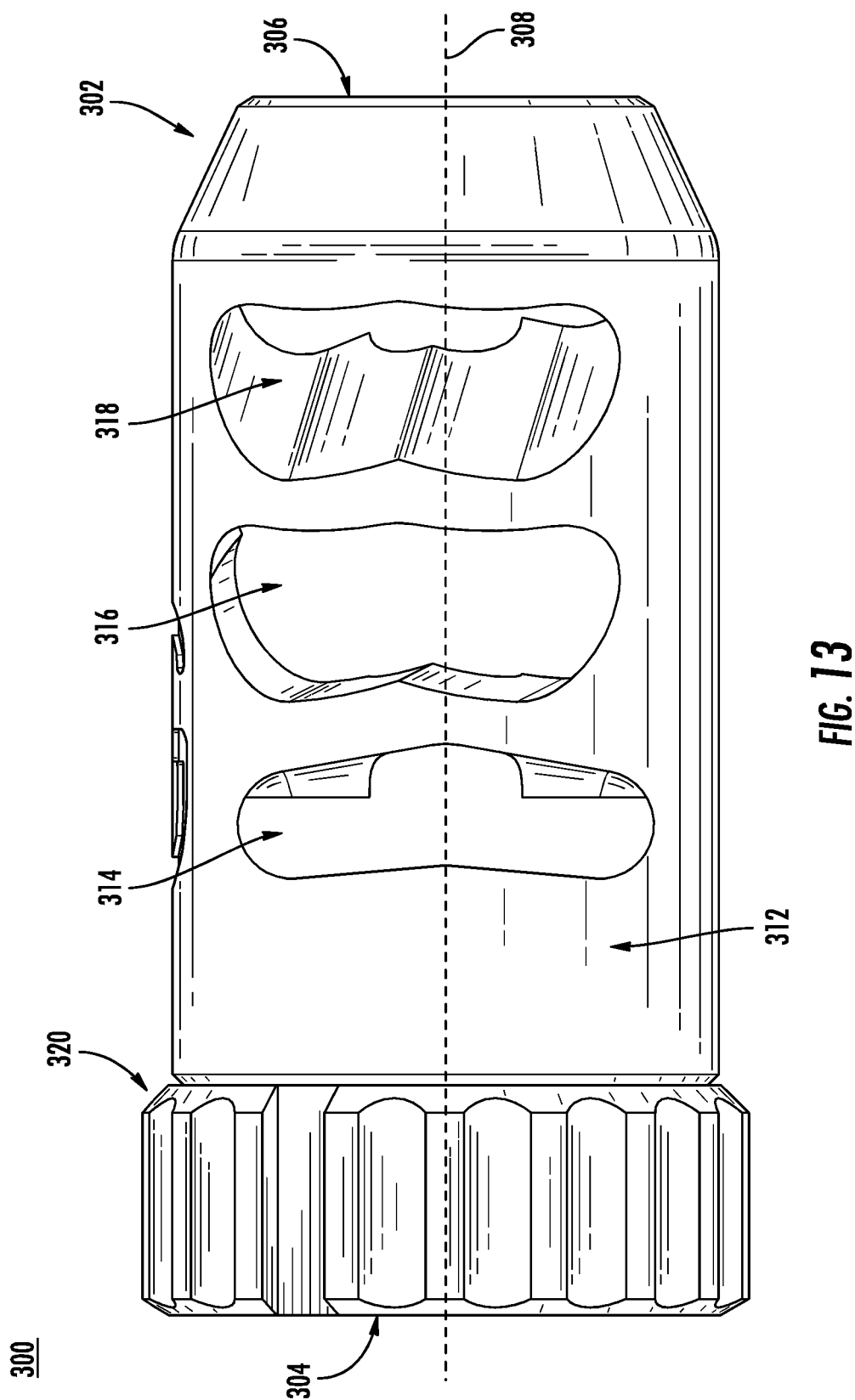
Figure 14:
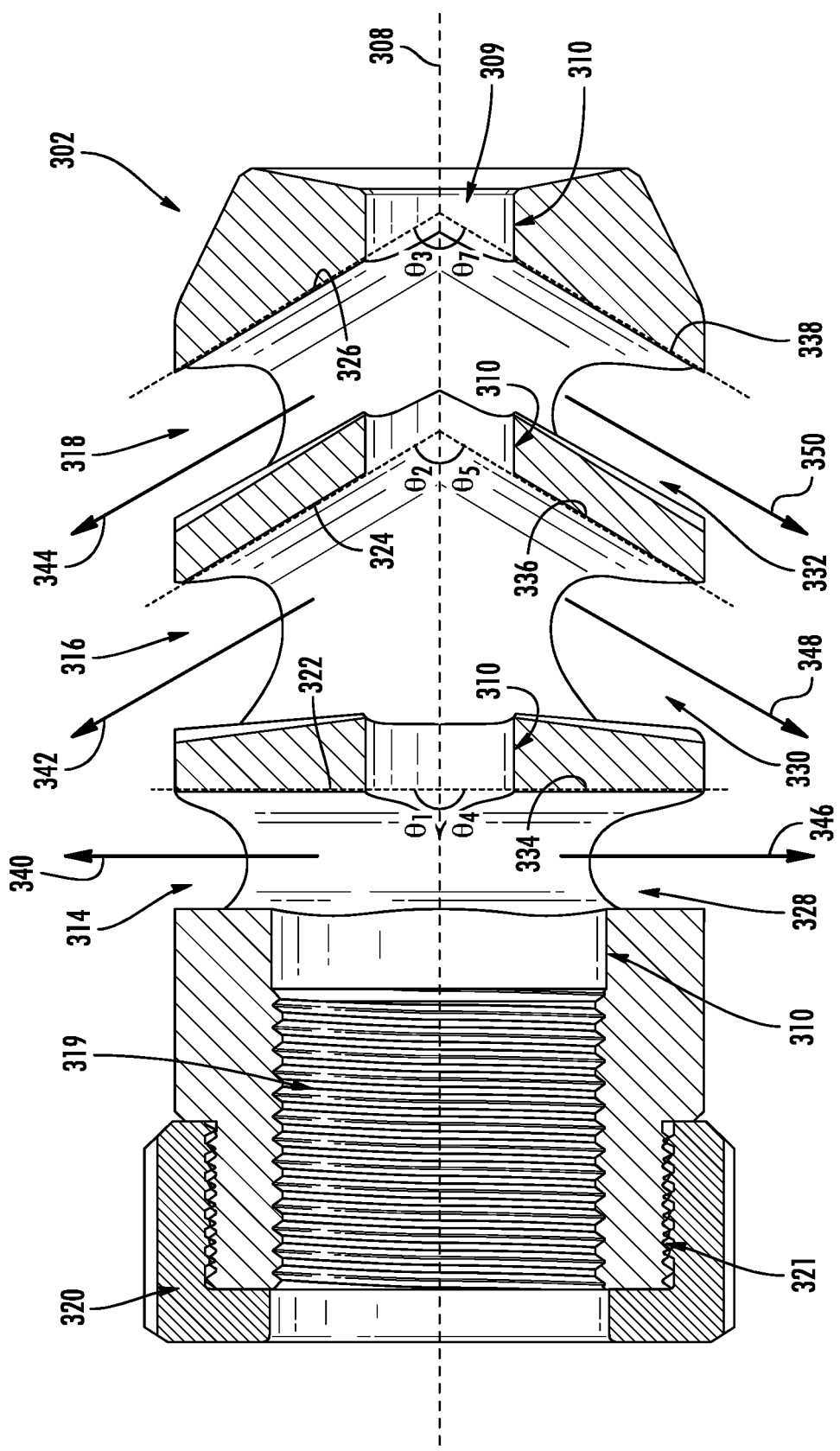
Figure 15:
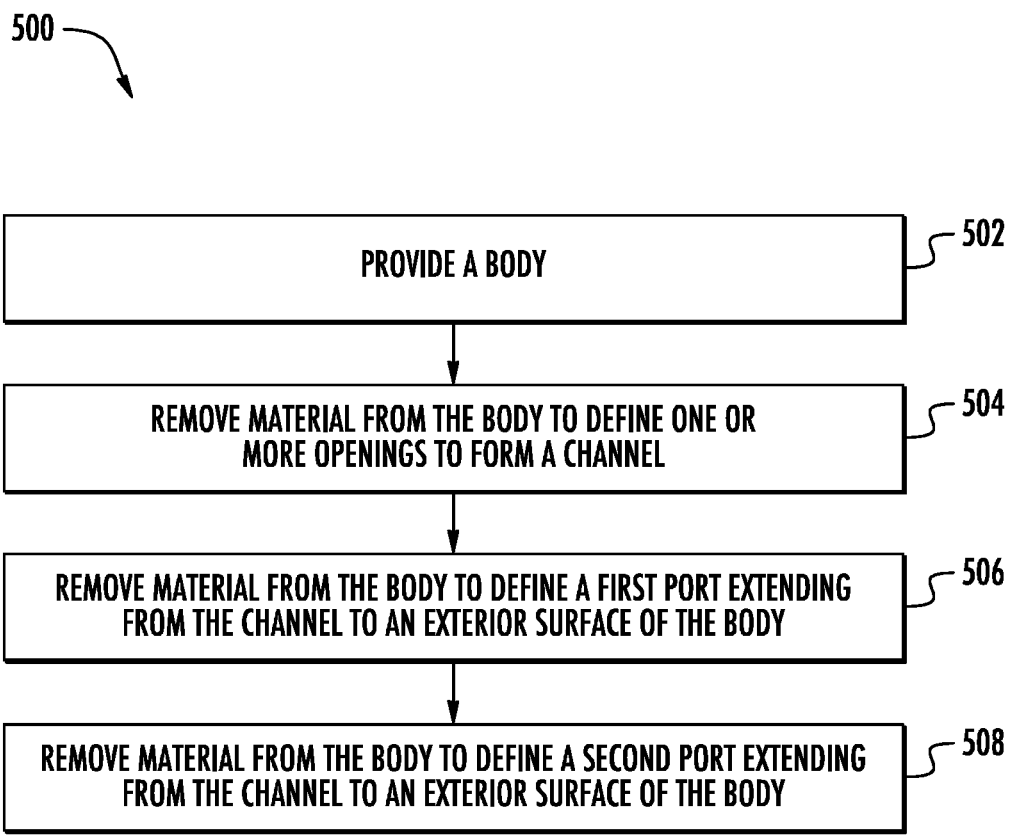

FIG. 1 illustrates a side view of a firearm according to some example embodiments;

FIG. 2 illustrates a cross-sectional view of a portion of the firearm of FIG. 1 according to some example embodiments;

FIG. 3 illustrates a perspective view of an example muzzle brake according to some example embodiments;

FIG. 4 illustrates a top view of the example muzzle brake of FIG. 3;

FIG. 5 illustrates another perspective view of the example muzzle brake of FIG. 3;

FIG. 6 illustrates a side view of the example muzzle brake of FIG. 3;

FIG. 7 illustrates an end view of the muzzle brake of FIG. 3 from a second end;

FIG. 8 illustrates an exploded view of the muzzle brake of FIG. 3 including an associated nut;

FIG. 9 illustrates a cross-sectional view of the example muzzle brake of FIG. 4 taken along the line A-A in FIG. 6;

FIG. 10 illustrates a perspective view of another example muzzle brake according to some example embodiments;

FIG. 11 illustrates a top view of the example muzzle brake of FIG. 10;

FIG. 12 illustrates an exploded view of the muzzle brake of FIG. 10 including an associated nut;

FIG. 13 illustrates a side view of the example muzzle brake of FIG. 10;

FIG. 14 illustrates a cross-sectional view of the example muzzle brake of FIG. 10 taken along the line B-B in FIG. 10; and FIG. 15 illustrates an example method of manufacturing a muzzle brake according to some example embodiments.

DETAILED DESCRIPTION

Overview

Some embodiments of the present invention will now be described more fully hereinafter with reference to the accompanying drawings, in which some, but not all, embodiments of the invention are shown. Like reference numerals refer to like elements throughout. Indeed, various embodiments of the invention may be embodied in many different forms and should not be construed as limited to the embodiments set forth herein. Rather, these embodiments are provided so that this disclosure will satisfy applicable legal requirements.

As used herein, the term "or" is used in both the alternative and conjunctive sense, unless otherwise indicated. The term "along," and similarly utilized terms, means near or on, but not necessarily requiring directly on an edge or other referenced location. The terms "approximately," "generally," and "substantially" refer to within manufacturing and/or engineering design tolerances for the corresponding materials and/or elements unless otherwise indicated. Thus, use of any such aforementioned terms, or similarly interchangeable terms, should not be taken to limit the spirit and scope of embodiments of the present invention.

The figures are not drawn to scale and are provided merely to illustrate some example embodiments of the inventions described herein. The figures do not limit the scope of the present disclosure or the appended claims. Several aspects of the example embodiments are described below with reference to example applications for illustration. It should be understood that numerous specific details, relationships, and methods are set forth to provide a full understanding of the example embodiments. One having ordinary skill in the relevant art, however, will readily recognize that the example embodiments can be practiced without one or more of the specific details and/or with other methods. In other instances, well-known structures and/or operations are not shown in detail to avoid obscuring the example embodiments.

The operational cycle of the firearm includes the propelling of a projectile (e.g., a bullet of a cartridge) through a barrel of the firearm such as in response to actuation of a trigger by an operator associated with the firearm and ignition of a propellant. For example, a cartridge containing the projectile (e.g., the bullet) may be stripped from a magazine by a bolt and fed into a chamber of the barrel as the firearm cycles. An inner surface of the barrel at the chamber may support the cartridge casing during ignition of the cartridge propellent, preventing the cartridge casing from deforming, splitting, or otherwise misfiring during the increase in internal pressure and facilitating direction of the expanding gases behind the bullet to propel the bullet down the bore of the barrel. These expanding gases (e.g., pressurized gas within the barrel), however, may cause a reaction force resulting in recoil (e.g., kick, knockback, etc.) as a rearward thrust towards an operator of the firearm. Additionally, the forces generated by these expanding gases may result in muzzle rise (e.g., muzzle flip, muzzle climb, etc.) where the muzzle end of the firearm tends to elevate, for example, as a result of the interaction between the user's body and the recoil. A muzzle brake attached to the muzzle end of the firearm's barrel may operate to counteract this recoil and/or muzzle rise by redirecting a portion of the high-pressure propellant gas received from the muzzle end of the firearm's barrel.

The use of muzzle brakes and recoil compensators to attempt to addresses these issues may result in exposure of the operator to increased sound pressure, lead exposure, high pressure gas, and/or the like that may be hazardous to the operator and may result in poorer overall shooting performance. For example, muzzle brakes may use ports adjacent to a line of travel of the projectile at the end of a barrel to redirect at least a portion of the propellant gas that is exiting the barrel towards a side and/or rear of the firearm. The resulting force imparted by the gas on these port surfaces of the muzzle brake may apply a force to the firearm that counteracts the recoil forces experienced by the firearm. These ports, however, expose an operator of the firearm to hazards in that the sound, flash, pressure waves, and smoke (e.g., sometimes containing lead) that is typically discharged away from the operator (e.g., in the direction of the projectile) is redirected by the muzzle brake at least partially towards the operator or closer to the operator. This redirection may, for example, result in eyesight and/or hearing damage to the operator.

The embodiments of the present disclosure, as described hereafter, however, may operate to reduce or eliminate potential harm to the operator by disrupting the discharge of gas that would otherwise be directed towards an operator and/or in the direction of nearby personnel. For example, the embodiments described hereinafter may provide a muzzle brake with at least a first port and a second port along the length of the muzzle brake body where the first port may be closer to the muzzle end of the firearm. The first port may direct a first portion of the propellant gas exiting the barrel to an external environment of the muzzle brake that at least partially disrupts a second portion of the gas directed by the second port from the interior of the muzzle brake. This disruption may be accomplished by directing (e.g., via a surface of the first port or otherwise) the first portion of gas exiting the first port at an angle that is greater than an angle at which the second portion of gas exits the second port when measured relative to the first, muzzle-engaging end of the muzzle brake. For example, the first port closest to the operator of the firearm may be oriented farther forward than one or more downstream, distal ports, such that the downstream, distal ports provide a greater braking function than the first port, while the first port disrupts the potentially harmful gas flow towards the user. In some embodiments, the first port may be oriented perpendicular or substantially perpendicular to the axis of the barrel, the muzzle brake, and the line of travel of the bullet, and the second port (and any subsequent ports positioned distal of the second port) may be oriented at least partially rearward. In some embodiments of the present disclosure, the ports may direct muzzle rapport either above or below the head level of nearby personnel. For example, the ports (e.g., the first port and/or any distally-positioned port) may be oriented at least partially upwards or downwards relative to the neutral firing position of the firearm so that the rapport is configured to travel at least partially upwards and/or at least partially downwards relative to the user's head level and/or the level of the barrel to which the muzzle brake is attached. For example, in some embodiments, one or more of the ports may be oriented off-axis relative to the axis of the barrel and off-plane relative to a plane extending horizontally from the barrel axis. In some embodiments, the first port may be off-axis and off-plane and may be configured to redirect on-plane gas flow from the second and subsequent ports into an off-plane direction.

Example Firearm

With reference to FIG. 1, a firearm 10 is shown configured to engage the muzzle brake embodiments of the present application. As example firearm 10 may include a barrel 12, an upper receiver 14, a lower receiver assembly 100; a magazine 106, a grip 110, a trigger guard 102, an action, including a bolt carrier group (e.g., bolt, firing pin, ejector, etc.), an autoloading system (e.g., gas driven system (gas direct gas impingement, gas piston, etc.), recoil-driven autoloader, inertia-driven autoloader, etc.) (not shown), buttstock 16, magazine catch 18, ejection port 17, and/or other firearm components that would be appreciated in light of the present disclosure. In some embodiments, a muzzle end 12A of the barrel 12 may be configured to receive the muzzle brake (e.g., via threads on the outer surface of the muzzle end). In some embodiments, the firearm may be an AR-15 platform weapon configured to fire any of the cartridges disclosed herein or known in the art. Although illustrated and described hereafter with reference an example AR-15 platform that receives the muzzle brake, the present disclosure contemplates that the muzzle brake may be configured for use with a barrel of any firearm or any firearm platform (e.g., an AR platform, an AK-47 platform, an AK-74 platform, a .50 caliber platform, automatic firearms, semi-automatic firearms, bolt-action firearms, among others) for any purpose (e.g., hunting rifles, military rifles, enthusiast rifles, target rifles, competition rifles, etc.). Furthermore, a "firearm" of the present disclosure may refer to any device configured to fire a projectile regardless of size or manner of operation, such as 50+ caliber rifles regardless of mounting position or use, anti-material rifles, vehicle armaments, armored fighting vehicles (e.g., tanks and main battle tank main guns, armored cars, armored personnel carriers, infantry fighting vehicles, etc.), artillery devices (e.g., mid-level artillery), and/or the like.

With reference to FIG. 2, according to some embodiments, a magazine 106 may be held in a magazine well 112 defined by a lower receiver of the firearm. The magazines 106 and the magazine well 112 may include a clearance that may allow the magazine to drop free when released while also holding the magazine 106 in a stable position. This stable positioning may allow a cartridge 24 to be stripped from the top of the magazine 106 by a bolt 22 and fed forward and upward into the chamber 26 of the barrel 12 as the firearm cycles. The bolt 22 may then lock with a barrel extension 28 to hold the cartridge 24 in place. The bolt lugs 22A interface with the locking lugs 29 of barrel extension 28 to lock the bolt 22, for example, by inserting the bolt lugs 22A between the barrel extension locking lugs 29 and rotating the bolt 22 about its longitudinal axis to align the rear of the bolt lugs 22A with the inner, forward surface of the barrel extension locking lugs 29. The inner surface 30 of the barrel 12 at the chamber 26 may support the cartridge casing during ignition of the cartridge propellent, preventing the cartridge casing from deforming, splitting, or otherwise misfiring during the increase in internal pressure and facilitating direction of the expanding gases behind the bullet to propel the bullet down the bore of the barrel. Although described herein with reference to a barrel 12 that engages a barrel extension 28, the present disclosure contemplates that, in some embodiments, the barrel 12 may instead include locking lugs 29 (e.g., without a barrel extension 28).

With continued reference to FIG. 2, a cross-section of a portion of the firearm 10 is shown. In various embodiments, the barrel 12 includes a muzzle end 12A and a chamber end 12B that may attach to a barrel extension 28 attached to the upper receiver 14. The barrel extension 28 and the chamber end 12B of the barrel 12 may be connected via barrel interface surfaces 28B (e.g., threading or the like). In some embodiments, the outer surface of the barrel 12 and inner surface of the barrel extension 28 may have complementary surfaces, such as threading, for engaging the components. The barrel 12 and barrel extension 28 may be held together by a fastener 28A (e.g., a set screw or the like.).

The depicted firearm 10 is further shown with a bolt carrier group 20 and a bolt 22 configured to strip a cartridge 24 from the magazine 106 and feed the cartridge into the chamber 26 of the chamber end 12B of the barrel 12 for firing. The cartridge 24 may be retained in the chamber 26 by a taper in the inner surface 30 of the barrel 12 at the front end and by the bolt 22 at the rear end (e.g., via engagement between the cartridge 24 and a corresponding recess 15 defined by the bolt), with the chamber 26 providing support for the casing. Firing of cartridge 24 occurs during actuation of trigger 34 while the bolt carrier group 20 is in the forward position (e.g., toward the left of FIG. 2), and the bolt lugs 22A are engaged with the barrel extension lugs 29. Actuation of trigger 34 causes disconnector 35 to release hammer 36. The firing pin 38 is driven toward the primer of cartridge 24 when the firing pin 38 is struck by hammer 36, thus firing the chambered cartridge 24. Gas delivery system 32 directs at least some of the expanding gases generated by firing the chambered cartridge 24 from a location within the barrel at or near the muzzle end to at least force the bolt carrier group 20 rearward (e.g., toward the right of FIG. 2) causing disconnection of the lugs, extraction of the spent cartridge casing from chamber 26, ejection of the spent cartridge from the chamber 26 via the ejection port 17, and resetting the trigger assembly components (e.g., hammer 26, disconnector 35, trigger 34, and other trigger components known in the art). Various embodiments of the present disclosure may apply to automatic, semi-automatic, bolt-action, and/or any other propellant driven firearms having a barrel through which a projectile is driven by propellant gas.

Example Muzzle Brakes

With reference to FIGS. 3-9, an embodiment of a muzzle brake 200 of the present disclosure is illustrated. As shown, the muzzle brake 200 may define a body 202 that may be, in some embodiments, a single, integral body (e.g., formed from a single piece of material). In other embodiments, the body 202 may be formed as an assembly or collection of distinct elements or parts. In any embodiment, the muzzle brake 200 (e.g., the body 202) may define a first end 204, a second end 206 opposite the first end 204, and an axis 208 extending therebetween. As described above, the first end 204 of the body 202 may be configured to attach to the muzzle end of the barrel (e.g., muzzle end 12A in FIGS. 1-2) of a firearm. In order to secure the muzzle brake 200 to the muzzle end 12A of the barrel 12 in some embodiments, the muzzle brake 200 may include a threaded first end comprising internal threads 219 for engaging a corresponding external thread on the barrel. In some embodiments, a nut 220 may be secured to the exterior of the first end of the muzzle brake (e.g., via external threads 221 shown in FIG. 8 on the threaded first end) to assist with positioning and securing the muzzle brake to the barrel at a desired orientation. For example, a rotation of the nut 220 in an instance in which the internal threads 219 of the muzzle brake 200 are engaged with the corresponding external thread of the barrel, may cause the nut 220 to contact a raised flange on the barrel so as to create tension between the internal threads 219 and the raised flange. In doing so, an operator of the firearm may more easily adjust the rotational position of the muzzle brake 200 relative the barrel (e.g. clock the muzzle brake 200). Although illustrated with a threaded end 219, 221 and nut 220, the present disclosure contemplates that the muzzle brake may define any attachment mechanism in order to engage the muzzle end 12A of the barrel of the firearm 10 and align the channel 209 of the muzzle brake with the bore of the barrel 12. For example, the threading profile of the threaded end 219, 221 and of the nut 220 may vary (e.g., ½-28, ⅝-24, ¾-28, etc.) based upon the firearm with which the muzzle brake 200 is coupled. Although described herein with reference to a muzzle brake 200 that is attachable (e.g., removably attached) to the muzzle end 12A of a barrel 12, the present disclosure also contemplates that, in some embodiments, the muzzle brake 200 may be formed integral to the muzzle end of the barrel 12. In some embodiments, the nut 220 may define one or more grooves configured to receive corresponding projections of, for example, a wrench so as to tighten the nut 220 as described above (e.g., to provide maximum tool engagement). For example, the nut 220 shown in FIG. 3 includes three rectangular grooves extending in an axial direction and configured to engage a corresponding wrench for tightening. In some embodiments, the rounded grooves depicted on the nut 220 between rectangular grooves may additionally or alternatively be engaged by a wrench having correspondingly shaped engagement surfaces.

The body 202 of the muzzle brake 200 may further define one or more openings 210 intersecting the axis 208 to form a channel 209 extending between the first end 204 and the second end 206 along the axis 208. As illustrated in the cross-sectional view of, for example, FIG. 9, the one or more openings 210 may be aligned along the axis 208 so as to form a channel 209 through which a projectile from the firearm 10 may travel. The openings 210 may be defined in the body 202 and may be connected via the surrounding structure of the body as shown in FIGS. 3-9. During a firing operation as described above, pressurized gas within the bore of the barrel 12 may propel the projectile (e.g., the bullet from cartridge 24) along the barrel and into the muzzle brake 200 attached to the barrel 12 via the first end 204. The one or more openings 210 may be dimensioned (e.g., size and shaped) to receive the projectile therethrough to allow the projectile to travel along the axis 208 from the first end 204 to the second end 206 and onwards towards its target. The dimensions of the one or more openings 210 may be determined, at least in part, on corresponding dimensions of the projectile fired by the firearm 10 to allow clearance around the projectile for firing while diverting at least some of the gas exiting the barrel. For example, the one or more openings 210 may define a diameter that is approximately 0.010 inches to 0.030 inches larger than a corresponding diameter of the projectile fired by the firearm so as to prevent unintended contact between the projectile and the muzzle brake 200. In some embodiments, the one or more openings 210, defining a channel through the muzzle brake, may be as narrow as possible without allowing the projectile to strike the brake. In some embodiments, a majority of the gas that exits the brake does so through the first port(s).

The body 202 of the muzzle brake may include one or more ports through which at least a portion of the gas propelling the projectile is configured to be redirected, and this redirection may impart a force on the firearm at the muzzle brake to at least partially counter the forces of the firing operation (e.g., recoil). The body 202 of the muzzle brake 200 may define a first port 214 extending from the channel 209 to an exterior surface 212 of the body. The first port 214 may define an opening in the body 202 such that fluid communication between the channel 209 and an external environment of the muzzle brake is provided via the first port 214. In operation, at least a portion of the gas exiting the barrel into the muzzle brake 200 may be redirected out the first port 214 (e.g., via impingement with surface 222). While depicted having somewhat different angles and/or shapes, each of the ports disclosed herein may include a similar general functionality based upon similar operational principles.

The body 202 of the muzzle brake 200 may define a second port 216 extending from the channel 209 to the exterior surface 212, and the second port 216 may be disposed between the first port 214 and the second end 206. The second port 216 may similarly define an opening in the body 202 such that fluid communication between the channel 209 and the external environment of the muzzle brake is provided via the second port 216. As shown in FIGS. 3-8, the external surface 212 of the body 200 may define at least partially cylindrical shape such that each of the disclosed ports may define openings that extend radially from the channel 209 to the external surface 212. In some embodiments, the first port 214 may, at all locations of the first port 214, be axially closer to the first end 204 than all locations of the second port 216.

As a projectile travels through the channel 209 of the body 202, the gas following the projectile may expand within the body 202 into the ports 214, 216, such as due to a pressure differential between the gas exiting the barrel and the air pressure of the external environment of the muzzle brake 200. In the embodiment depicted in FIG. 9, a first portion 240 of the gas may be directed by the first port 214 and a second portion 242 of the gas may be directed by the second port 216 as the gas exits the muzzle brake. In order to reduce the effect (e.g., sound, pressure wave, etc.) of the gas discharged by the muzzle brake 200 on the user, the first portion 240 may at least partially disrupt the second portion 242 of the gas directed by the second port 216. The disruption may be caused by gas exiting the first port blocking, redirecting, or otherwise preventing or reducing the effect of the gas leaving the second port from traveling towards the user. As shown, for example in FIG. 9, the angle $\theta_2$ associated with the surface 224 of the second port 216 and at which the second portion 242 of the gas is directed by the second port 216 during operation may be at least partially in the direction of the operator of the firearm 10 (e.g., at least partially rearward towards the first end 204 and the rest of the firearm).

In various embodiments of the present disclosure, however, the angle $\theta_1$ associated with the surface 222 of the first port 214 and at which the first portion 240 of the gas is directed by the first port 214 may be greater than the angle $\theta_2$ at which the second portion 242 of the gas is directed by the second port 216 such that the first portion 240 of the gas disrupts the second portion 242 reducing the force of the gas discharged by the muzzle brake 200 in the direction of the operator (e.g., towards the firearm 10).

In the examples described herein, each angle is measured as shown in the figures, relative to the axis 208 and measured beginning from the direction of the first end 204. For example, as illustrated in FIG. 9, the angle $\theta_1$ may refer to the angle between the axis 208 and the direction at which the first portion 240 of gas exits the first port 214 when measured from the axis 208 relative to the first end 204. The angle $\theta_2$ may refer to the angle between the axis 208 and the direction at which the second portion 242 of gas exits the second port 216 when measured from the axis 208 relative to the first end 204.

As described herein, the portions of the gas exiting the various ports may refer to a collection of gas particles that make up the expanding propellant gas leaving the barrel. In this way, the angles $\theta_1$, $\theta_2$ may refer to an average angle at which the respective portions of gas exit the respective ports 214, 216, such that not all particles leaving each port are required to leave at precisely the same angle. For example, the present disclosure contemplates that at least some gas particles of the total first portion 240 of gas emitted by the first port 214 may expand into the exterior environment of the muzzle brake 200 at various angles greater and less than the depicted angle $\theta_1$; however, the first port 214 may be configured such that $\theta_1$ refers to the average angle of the first portion 240 of the gas directed by the first port 214. In some embodiments, at least a portion of the first portion 240 of gas emitted by the first port 214 may be at the angle $\theta_1$. In some embodiments, as shown in FIG. 9, the first angle $\theta_1$ at which the first portion 240 of the gas exits the first port 214 may be substantially perpendicular with respect to the axis 208. In some embodiments, the first angle $\theta_1$ at which the first portion 240 of the gas exits the first port 214 may be any angle, including greater or less than perpendicular, greater than the angle of any ports positioned distal of the first port (e.g., the second angle $\theta_2$ of the second port 216), such that the first portion 240 of gas may at least partially disrupt the other respective gases exiting the respective ports. In order to direct the first portion 240 of the gas, the first port 214 may define at least a portion of a surface 222 (e.g., distal surface of the first port 214 with respect to the first end 204) that defines an angle $\theta_1$ with respect to the axis 208 that is greater than an angle with respect to the axis 208 defined by at least a portion of a surface 224 (e.g., distal surface of the second port 216 with respect to the first end 204) of the second port 216. In some embodiments, the first angle $\theta_1$ of at least a portion of the surface 222 of the first port 214 may be substantially perpendicular with respect to the axis 208. In some embodiments, at least a portion of the leading surface 222 at the distal side (e.g., the side closer to the second end 206) of the first port 214 may be oriented at the first angle $\theta_1$. In some embodiments, a majority of the leading surface 222 at the distal side (e.g., the side closer to the second end 206) of the first port 214 may be oriented at the first angle $\theta_1$. In some embodiments, all of the leading surface 222 at the distal side (e.g., the side closer to the second end 206) of the first port 214 may be oriented at the first angle $\theta_1$. In some embodiments, at least a portion of the leading surface 222 at the distal side (e.g., the side closer to the second end 206) of the first port 214 and at a location closest to the external surface 212 of the muzzle brake 200 may be oriented at the first angle $\theta_1$. In some embodiments, all or substantially all of the width of the first port 214 may be oriented at a same angle for at least each radial position within the port. In some embodiments, at least a portion of the width of the first port 214 may be oriented at a different angle. These aforementioned features and relationships of the first port 214 also extend to and apply equally to the remaining ports but for the expressly described differences herein (e.g., differences in the angles $\theta$).

Similarly, at least some gas particles of the total second portion 242 of gas emitted by the second port 216 may expand into the exterior environment of the muzzle brake 200 at various angles; however, the second port 216 may be configured such that $\theta_2$ refers to the average angle of the second portion 242 of the gas directed by the second port 216. In some embodiments, at least a portion of the first portion 240 of gas emitted by the first port 214 may be at the angle $\theta_1$. In order to direct the second portion 242 of gas, the second port 216 may define at least a portion of a surface 224 (e.g., distal surface of the second port 216 with respect to the first end 204) that defines an angle $\theta_2$ with respect to the axis 208 that is less than $\theta_1$ as described above. In some embodiments, at least a portion of the leading surface 224 at the distal side (e.g., the side closer to the second end 206) of the second port 216 may be oriented at the second angle $\theta_2$. In some embodiments, a majority of the leading surface 224 at the distal side (e.g., the side closer to the second end 206) of the second port 216 may be oriented at the second angle $\theta_2$. In some embodiments, all of the leading surface 224 at the distal side (e.g., the side closer to the second end 206) of the second port 216 may be oriented at the first angle $\theta_2$. In some embodiments, at least a portion of the leading surface 224 at the distal side (e.g., the side closer to the second end 206) of the second port 216 and at a location closest to the external surface 212 of the muzzle brake 200 may be oriented at the second angle $\theta_2$. In some embodiments, all or substantially all of the width of the second port 216 may be oriented at a same angle for at least each radial position within the port. In some embodiments, at least a portion of the width of the second port 216 may be oriented at a different angle.

With reference to FIG. 6, a side view of the body 202 of the muzzle brake 200 is illustrated. As shown, in some embodiments, a cross-sectional area of the first port 214 at the exterior surface 212 of the muzzle brake 200 may be smaller than a cross-sectional area of the second port 216 at the exterior surface 212 of the muzzle brake 200 and any other ports distal of the first port (e.g., closer to the second end 206, such as the third port 218 described below). In some embodiments, the first port 214 and the second port 216 at the exterior surface 212 may define a respective width W1, W2 measured in a circumferential direction perpendicular to the axis 208 and a respective length L1, L2 measured in a longitudinal and axial direction parallel to the axis. In the depicted embodiment, the width W1 of the first port 214 may be substantially the same as the width W2 of the second port 216. In the depicted embodiment, the length L1 of the first port 214 may be less than the length L2 of the second port 216 resulting in the smaller cross-sectional area of the first port 214 at the exterior surface 212. These respective relationships may likewise apply to any ports positioned distal (e.g., towards the second end 206) of the first port, such as the third port 218 having width W3 depicted as substantially the same as the width W1 of the first port 214 and a length L3 depicted as greater than the length L1 of the first port 214. In some embodiments, as described herein, the second port 216 may be substantially the same in shape and orientation as the third port 218 or may be different than the third port 218.

In some embodiments, as shown in each of FIGS. 3-9, the muzzle brake 200 may further include a third port 218 defined between the second port 216 and the second end 206. In some embodiments, one or more additional ports may be interposed between the third port 218 and the second end 206 in substantially the same manner. The third port 218 may extend from the channel 209 to the exterior surface 212 of the body 202 similar to the second port 216. In the depicted embodiments, openings 210 are defined between each of the ports along the channel 209. The first port 214 may also be configured to direct the first portion 240 of the gas from the channel 209 to the external environment of the muzzle brake 200 so as to at least partially disrupt a third portion 244 of the gas directed by the third port 218 from the channel 218 to the external environment of the muzzle brake 200. In some embodiments, at least a portion of the total first portion 240 of gas emitted by the first port 214 may disrupt both the gas exiting the second port 216 and the gas exiting the third port 218, though they need not be exactly the same particles from the first portion. Similar to the description above with regard to the second port 216, some gas particles of the third portion 244 of gas emitted by the third port 218 may expand into the exterior environment of the muzzle brake 200 at various angles greater than and less than the depicted angle $\theta_3$. In some embodiments, the third port 218 may be configured such that the angle $\theta_3$ refers to the average angle of the third portion 244 of the gas directed by the third port 218. In some embodiments, at least a portion of the third portion 244 of gas emitted by the third port 218 may be at the angle $\theta_3$. In order to direct the third portion 244 of the gas, the third port 218 may also define at least a portion of a surface 226 (e.g., distal surface of the third port 218 with respect to the first end 204) that defines an angle $\theta_3$ with respect to the axis 208 that is less than the angle $\theta_1$ as described above. In some embodiments, at least a portion of the leading surface 226 at the distal side (e.g., the side closer to the second end 206) of the third port 218 may be oriented at the third angle $\theta_3$. In some embodiments, a majority of the leading surface 226 at the distal side (e.g., the side closer to the second end 206) of the third port 218 may be oriented at the third angle $\theta_3$. In some embodiments, all of the leading surface 226 at the distal side (e.g., the side closer to the second end 206) of the third port 218 may be oriented at the first angle $\theta_3$. In some embodiments, at least a portion of the leading surface 226 at the distal side (e.g., the side closer to the second end 206) of the third port 218 and at a location closest to the external surface 212 of the muzzle brake 200 may be oriented at the third angle $\theta_3$. In some embodiments, all or substantially all of the width of the third port 218 may be oriented at a same angle for at least each radial position within the port. In some embodiments, at least a portion of the width of the third port 218 may be oriented at a different angle.

In some embodiments, the relative position of the ports may overlap circumferentially. For example, in the embodiment depicted in FIG. 9, the second port 216 is shown with a radially inward most point of the leading surface 224 which is axially closer to the second end 206 than a radially outward most point of the trailing surface of the third port 218. In such embodiments, the third port 218 may still said to be closer to the distal end 206 than the second port 216.

In some embodiments, the angle $\theta_2$ at which the second portion 242 of the gas exits the second port 216 with respect to the axis is substantially the same as an angle $\theta_3$ at which the third portion 244 of the gas exits the third port 218 with respect to the axis 208. In such an embodiment, a cross-sectional area of the third port 218 at the exterior surface 212 of the muzzle brake 200 may also be the same as a cross-sectional area of the second port 216 at the exterior surface 212 of the muzzle brake 200. For example, the cross-sectional area of the third port 218 and the second port 216 at the exterior surface 212 may define a respective width W2, W3 measured in a circumferential direction perpendicular to the axis and a respective length L2, W3 measured in a longitudinal and axial direction parallel to the axis 208. In the depicted embodiment, the width W3 of the third port 218 may be substantially the same as the width W2 of the second port 216. The length L3 of the third port 218 may also be substantially the same as the length L2 of the second port 216.

In other embodiments, the angle $\theta_2$ at which the second portion 242 of the gas exits the second port 216 with respect to the axis may be different than the angle $\theta_3$ at which the third portion 244 of the gas exits the third port 218 with respect to the axis 208. For example, in some embodiments, each nozzle may be oriented progressively more perpendicular to the axis 208 from the second end 206 to the first end 204. In such an embodiment, the third port 218 may be oriented at the shallowest angle (e.g., the most rearward), the second port 216 may be oriented at the second shallowest angle (e.g., between the first and third), and the first port 214 may be oriented at the greatest angle such that the first port at least partially disrupts the flow from both other ports.

In some embodiments, multiple axial rows of ports (e.g., 2, 3, 4, 5, etc.) may be present in substantially the same configurations described above, and such axial rows may be spaced circumferentially about the muzzle brake in equally spaced locations (e.g., to create a net zero force in the plane perpendicular to the axis 208) or in offset locations (e.g., to create a net force in the plane perpendicular to the axis 208, such as a downward force to offset any potential muzzle rise). For example, in some embodiments, the first port 214 and at least the second port 216 may form a first set of ports. The third port 218 may, in some embodiments that include a third port, also be part of the first set of ports.

For example, with reference to the embodiment shown in FIG. 9, the muzzle brake 200 may further include a fourth port 228 extending from the channel 209 to the exterior surface 212 of the body 202. The fourth port 228 may be axially aligned with the first port 214 on an opposing side of the exterior surface 212 of the muzzle brake 200. The fourth port 228 may generally serve the same purpose as the first port 214 to at least partially disrupt the flow of gas exiting one or more ports distal to the fourth port (e.g., ports 230, 232 shown in FIG. 9) as described below. In such an embodiment, a fifth port 230 extending from the channel 209 to the exterior surface 212 of the body 202 may also be defined. The fifth port 230 may be axially aligned with the second port 216 on the opposing side of the exterior surface 212 of the muzzle brake 200. In some further embodiments, a sixth port 232 may also be defined extending from the channel 209 to the exterior surface 212 of the body 202 that is axially aligned with the third port 218 on the opposing side of the exterior surface 212. In the depicted embodiment, the first axial row of ports (e.g., the first 214, second 216, and third 218 ports) are disposed opposite (e.g., 180 degrees circumferentially spaced about the muzzle brake from) the second axial row of ports (e.g., the fourth 228, fifth 330, and sixth 232 ports).

In such an embodiment, the fourth port 228 may operate similar to the first port 214 in that the fourth port 228 may be configured to direct a fourth portion 246 of the gas from the channel 209 to the external environment of the muzzle brake 202 that at least partially disrupts a fifth portion 248 of the gas directed by the fifth port 230 from the channel 209 to the external environment of the muzzle brake 200. Furthermore, the fourth portion 246 of the gas from the fourth port 228 may at least partially disrupt a sixth portion 250 of the gas directed by the sixth port 232 from the channel 209 to the external environment of the muzzle brake 200. Similar to the first set of ports that includes the first port 214, the second port 216, and/or the third port, the fourth portion 246 of the gas may be directed at an angle $\theta_4$ (e.g., by distal surface 234 of the fourth port 228 with respect to the first end 204) by the fourth port 228 where the angle $\theta_4$ is measured from the axis 208 relative to the direction of the first end 204. The fifth portion 248 of the gas may be directed at an angle $\theta_5$ (e.g., by distal surface 236 of the fifth port 230 with respect to the first end 204) by the fifth port 230 where the angle $\theta_5$ is also measured from the axis 208 relative to the first end 204. Furthermore, the sixth portion 250 of the gas may be directed at an angle $\theta_6$ (e.g., by distal surface 238 of the sixth port 232 with respect to the first end 204) by the sixth port 232 where the angle $\theta_6$ is also measured from the axis 208 relative to the first end 204. As above, the angle $\theta_4$ may be substantially perpendicular with respect to the axis 208 in some embodiments. In some embodiments, the angle $\theta_4$ may be greater than each of angle $\theta_5$ and $\theta_6$. Unless noted otherwise, each of the features and configurations of the first axial row of ports (e.g., the first 214, second 216, and third 218 ports) may likewise apply to the second and any additional axial rows of ports.

With reference to FIGS. 10-14, another embodiment of a muzzle brake of the present disclosure is illustrated. Unless expressly stated otherwise, each of the features and configurations of the muzzle brake 300 of FIGS. 10-14 may be substantially the same as the features and configurations of the muzzle brake 200 shown in FIGS. 3-9. As shown, the muzzle brake 300 may define a body 302 that may be, in some embodiments, a single, integral body (e.g., formed from a single piece of material). In other embodiments, the body 302 may be formed as an assembly or collection of distinct elements or parts. In any embodiment, the muzzle brake 300 (e.g., the body 302) may define a first end 304, a second end 306 opposite the first end 304, and an axis 308 extending therebetween. Similar to the embodiment of FIGS. 3-9, the first end 304 of the body 302 may be configured to attach to the muzzle end (e.g., muzzle end 12A in FIGS. 1-2) of a firearm. In order to secure the muzzle brake 300 to the muzzle end 12A of the barrel 12, the depicted muzzle brake 300 may include a threaded end (e.g., internal threads 319 in FIG. 10 and external threads 321 in FIG. 12), with the internal threads 319 to engage a muzzle and external threads 321 that engage threads of a corresponding nut 320.

The body 302 of the muzzle brake 300 may further define one or more openings 310 intersecting the axis 308 to form a channel 309 extending between the first end 304 and the second end 306 along the axis 308. As illustrated in the cross-sectional view of, for example, FIG. 9, the one or more openings 310 may be aligned along the axis 308 so as to form a channel 309 through which a projectile from the firearm 10 may travel as described above. In various embodiments, the dimensions of the one or more openings 310 may be based, at least in part, on corresponding dimensions of the projectile fired by the firearm 10. The body 302 of the muzzle brake 300 may further define a first port 314 extending from the channel 309 to an exterior surface 312 of the body. The first port 314 may define an opening in the body 302 such that fluid communication between the channel 309 and an external environment of the muzzle brake is provided via the first port 314. The body 302 of the muzzle brake 300 may also define a second port 316 extending from the channel 309 to the exterior surface 312, and the second port 316 may be disposed between the first port 314 and the second end 306. The second port 316 may similarly define an opening in the body 302 such that fluid communication between the channel 309 and the external environment of the muzzle brake is provided via the second port 316.

As a projectile travels through the channel 309 of the body 302, the gas following the projectile may expand within the body 302 into the ports (e.g., ports 314, 316, and/or 318) such as due to a pressure differential between the gas exiting the barrel and the air pressure of the external environment of the muzzle brake 300. As shown in FIG. 14, a first portion 340 of the gas may be directed by the first port 314 and a second portion 342 of the gas may be directed by the second port 316. In order to reduce the effect (e.g., sound, pressure wave, etc.) of the gas discharged by the muzzle brake 300, the first portion 340 may at least partially disrupt the second portion 342 of the gas directed by the second port 316. As shown, for example in FIG. 14, the angle $\theta_2$ at which the second portion 342 of the gas is directed by the second port 316 may be, in operation, in the direction of the operator of the firearm. In conventional designs, this second portion 342 of the gas may be hazardous to the operator of the firearm 10 as described above.

In the embodiments of the present disclosure, however, the angle $\theta_1$ at which the first portion 340 of the gas is directed by the first port 314 may be greater than the angle $\theta_2$ at which the second portion 342 of the gas is directed by the second port 316 such that the first portion 340 of the gas disrupts the second portion 342 reducing the force of the gas discharged by the muzzle brake in the direction of the operator (e.g., at least partially rearwards towards the firearm 10). In some embodiments, the first angle $\theta_1$ at which the first portion 340 of gas is directed by the first port 314 with respect to the axis 309 may be substantially perpendicular. In some embodiments, the first angle $\theta_1$ at which the first portion 340 of gas is directed by the first port 314 with respect to the axis 309 may be greater than approximately 90 degrees such that the first portion 340 is directed at least partially towards the second portion 342 and second end 306. In some embodiments, the first angle $\theta_1$ at which the first portion 340 of gas is directed by the first port 314 with respect to the axis 309 may be less than approximately 90 degrees such that the first portion 340 is directed at least partially towards the barrel and user of the firearm while still providing the disruption functionality described herein.

Similar to the muzzle brake 200, the portions 340, 342 of the gas exiting the first port 314 and the second port 316, respectively, of the muzzle brake 300 may refer to a collection of gas particles that make up the expanding propellant gas leaving the barrel. In this way, the angles $\theta_1$, $\theta_2$ may refer to an average angle at which the respective portions of gas exit the respective ports 314, 316, such that not all particles leaving each port are required to leave at precisely the same angle. For example, the present disclosure contemplates that at least some gas particles of the total first portion 340 of gas emitted by the first port 314 may expand into the exterior environment of the muzzle brake 300 at various angles greater than and less than the depicted angle $\theta_1$; however, the first port 314 may be configured such that $\theta_1$ refers to the average angle of the first portion 340 of the gas directed by the first port 314. In some embodiments, at least a portion of the first portion 340 of gas emitted by the first port 314 may be at the angle $\theta_1$. In some embodiments, as shown in FIG. 14, the first angle $\theta_1$ at which the first portion 340 of the gas exits the first port 314 may be substantially perpendicular with respect to the axis 308. In some embodiments, the first angle $\theta_1$ at which the first portion 340 of the gas exits the first port 314 may be any angle, including greater or less than perpendicular, greater than the angle of any ports positioned distal of the first port (e.g., the second angle $\theta_2$ of the second port 316), such that the first portion 340 of gas may at least partially disrupt the other respective gases exiting the respective ports.

In order to direct the first portion 340 of the gas, the first port 314 may define at least a portion of a surface 322 (e.g., distal surface of the first port 314 with respect to the first end 304) that defines an angle $\theta_1$ with respect to the axis 308 that is greater than an angle with respect to the axis 308 defined by at least a portion of a surface 324 (e.g., distal surface of the second port 316 with respect to the first end 304) of the second port 316. In some embodiments, the first angle $\theta_1$ of at least a portion of the surface 322 of the first port 314 may be substantially perpendicular with respect to the axis 308. In some embodiments, at least a portion of the leading surface 322 at the distal side (e.g., the side closer to the second end 206) of the first port 314 may be oriented at the first angle $\theta_1$. In some embodiments, a majority of the leading surface 322 at the distal side (e.g., the side closer to the second end 306) of the first port 314 may be oriented at the first angle $\theta_1$. In some embodiments, all of the leading surface 322 at the distal side (e.g., the side closer to the second end 306) of the first port 314 may be oriented at the first angle $\theta_1$. In some embodiments, at least a portion of the leading surface 322 at the distal side (e.g., the side closer to the second end 306) of the first port 314 and at a location closest to the external surface 312 of the muzzle brake 300 may be oriented at the first angle $\theta_1$.

In some embodiments, all or substantially all of the width of the first port 314 may be oriented at a same angle for at least each radial position within the port. In some embodiments, at least a portion of the width of the first port 314 may be oriented at a different angle. These aforementioned features and relationships of the first port 314 also extend to and apply equally to the remaining ports but for the expressly described differences herein (e.g., differences in the angles $\theta$). In some embodiments, the surface 322 of the first port 314 and/or the surface 334 of the fourth port 328 may each define a knife's edge (e.g., converging concave surfaces) positioned along the center of the first port 314 and the fourth port 328 (e.g., along the axis 308 at the intersection of the ports as shown in FIG. 13). In such an embodiment, this knife's edge may operate to direct the first portion 340 and the fourth portion 346, respectively, in a direction away from the axis 308. Said differently, the converging of the concave surfaces may operate to divert at least a portion of the first portion 340 and the fourth portion 346 to the left and/or right of the direction of travel of the projectile through the channel 309 into the respective ports 314, 334.

Similarly, at least some gas particles of the total second portion 342 of gas emitted by the second port 316 may expand into the exterior environment of the muzzle brake 300 at various angles; however, the second port 316 may be configured such that $\theta_2$ refers to the average angle of the second portion 342 of the gas directed by the second port 316. In some embodiments, at least a portion of the first portion 240 of gas emitted by the first port 314 may be at the angle $\theta_1$. In order to direct the second portion 342 of gas, the second port 316 may define at least a portion of a surface 324 (e.g., distal surface of the second port 316 with respect to the first end 304) that defines an angle $\theta_2$ with respect to the axis 308 that is less than $\theta_1$ as described above. In some embodiments, at least a portion of the leading surface 324 at the distal side (e.g., the side closer to the second end 306) of the second port 316 may be oriented at the second angle $\theta_2$. In some embodiments, a majority of the leading surface 324 at the distal side (e.g., the side closer to the second end 306) of the second port 316 may be oriented at the second angle $\theta_2$. In some embodiments, all of the leading surface 324 at the distal side (e.g., the side closer to the second end 306) of the second port 316 may be oriented at the first angle $\theta_2$. In some embodiments, at least a portion of the leading surface 324 at the distal side (e.g., the side closer to the second end 306) of the second port 316 and at a location closest to the external surface 312 of the muzzle brake 200 may be oriented at the second angle $\theta_2$. In some embodiments, all or substantially all of the width of the second port 316 may be oriented at a same angle for at least each radial position within the port. In some embodiments, at least a portion of the width of the second port 316 may be oriented at a different angle. In doing so, the interior volume of the second port 316 and the fifth port 330 may be greater than that of the remaining ports in the muzzle brake 200 so as to increase the volume of gas exiting the muzzle brake 200 via the second port 316 and the fifth port 330 to provide improved recoil mitigation.

In some embodiments, the muzzle brake 300 may further include a third port 318 defined between the second port 316 and the second end 306. In some embodiments, one or more additional ports may be interposed between the third port 318 and the second end 306 in substantially the same manner. The third port 318 may extend from the channel 309 to the exterior surface 312 of the body 302 similar to the second port 316. In the depicted embodiments, openings 310 are defined between each of the ports along the channel 309. The first port 314 may also be configured to direct the first portion 340 of the gas from the channel 309 to the external environment of the muzzle brake 300 so as to at least partially disrupt a third portion 344 of the gas directed by the third port 318 from the channel 318 to the external environment of the muzzle brake 300. In some embodiments, at least a portion of the total first portion 340 of gas emitted by the first port 314 may disrupt both the gas exiting the second port 316 and the gas exiting the third port 318, though they need not be exactly the same particles from the first portion. Similar to the description above with regard to the second port 316, some gas particles of the third portion 344 of gas emitted by the third port 318 may expand into the exterior environment of the muzzle brake 300 at various angles greater than and less than the depicted angle $\theta_3$. In some embodiments, third port 318 may be configured such that the angle $\theta_3$ refers to the average angle of the third portion 344 of the gas directed by the third port 318. In some embodiments, at least a portion of the third portion 244 of gas emitted by the third port 318 may be at the angle $\theta_3$. In order to direct the third portion 344 of the gas, the third port 318 may also define at least a portion of a surface 326 (e.g., distal surface of the third port 318 with respect to the first end 304) that defines an angle $\theta_3$ with respect to the axis 308 that is less than the angle $\theta_1$ as described above. In some embodiments, at least a portion of the leading surface 326 at the distal side (e.g., the side closer to the second end 306) of the third port 318 may be oriented at the third angle $\theta_3$. In some embodiments, a majority of the leading surface 326 at the distal side (e.g., the side closer to the second end 306) of the third port 318 may be oriented at the third angle $\theta_3$. In some embodiments, all of the leading surface 326 at the distal side (e.g., the side closer to the second end 306) of the third port 318 may be oriented at the first angle $\theta_3$. In some embodiments, at least a portion of the leading surface 326 at the distal side (e.g., the side closer to the second end 306) of the third port 318 and at a location closest to the external surface 312 of the muzzle brake 300 may be oriented at the third angle $\theta_3$. In some embodiments, all or substantially all of the width of the third port 318 may be oriented at a same angle for at least each radial position within the port. In some embodiments, at least a portion of the width of the third port 318 may be oriented at a different angle.

In some embodiments, the relative position of the ports may overlap circumferentially. For example, in the embodiment depicted in FIG. 14, the second port 316 is shown with a radially inward most point of the leading surface 324 which is axially closer to the second end 306 than a radially outward most point of the trailing surface of the third port 318. In such embodiments, the third port 318 may still said to be closer to the distal end 306 than the second port 316.

In some embodiments, the angle $\theta_2$ at which the second portion 342 of the gas exits the second port 316 with respect to the axis is substantially the same as an angle $\theta_3$ at which the third portion 344 of the gas exits the third port 318 with respect to the axis 308. In other embodiments, the angle $\theta_2$ at which the second portion 342 of the gas exits the second port 316 with respect to the axis may be different than the angle $\theta_3$ at which the third portion 344 of the gas exits the third port 318 with respect to the axis 308. For example, in some embodiments, each nozzle may be oriented progressively more perpendicular to the axis 308 from the second end 306 to the first end 304. In such an embodiment, the third port 318 may be oriented at the shallowest angle (e.g., the most rearward), the second port 316 may be oriented at the second shallowest angle (e.g., between the first and third), and the first port 314 may be oriented at the greatest angle such that the first port at least partially disrupts the flow from both other ports.

In some embodiments, multiple axial rows of ports (e.g., 2, 3, 4, 5, etc.) may be present in substantially the same configurations described above, and such axial rows may be spaced circumferentially about the muzzle brake in equally spaced locations (e.g., to create a net zero force in the plane perpendicular to the axis 208) or in offset locations (e.g., to create a net force in the plane perpendicular to the axis 208, such as a downward force to offset any potential muzzle rise). For example, in some embodiments, the first port 314 and at least the second port 316 may form a first set of ports. The third port 318 may, in some embodiments, also be formed as part of the first set of ports. In such an embodiment, as shown in FIG. 14, the muzzle brake 300 may further include a fourth port 328 extending from the channel 309 to the exterior surface 312 of the body 302. The fourth port 328 may be axially aligned with the first port 314 on an opposing side of the exterior surface 312 of the muzzle brake 300. In such an embodiment, a fifth port 330 extending from the channel 309 to the exterior surface 312 of the body 302 may also be defined. the fifth port 330 may be axially aligned with the second port 316 on the opposing side of the exterior surface 312 of the muzzle brake 300. In some further embodiments, a sixth port 332 may also be defined extending from the channel 309 to the exterior surface 312 of the body 302 that is axially aligned with the third port 318 on the opposing side of the exterior surface 312.

In such an embodiment, the fourth port 328 may operate similar to the first port 314 in that the fourth port 328 may be configured to direct a fourth portion 346 of the gas from the channel 309 to the external environment of the muzzle brake 302 that at least partially disrupts a fifth portion 348 of the gas directed by the fifth port 330 from the channel 309 to the external environment of the muzzle brake 300. Furthermore, the fourth portion 346 of the gas from the fourth port 328 may at least partially disrupt a sixth portion 350 of the gas directed by the sixth port 332 from the channel 309 to the external environment of the muzzle brake 300. Similar to the first set of ports that includes the first port 314, the second port 316, and/or the third port, the fourth portion 346 of the gas may be directed at an angle $\theta_4$ (e.g., by distal surface 334 of the fourth port 328 with respect to the first end 304) by the fourth port 328 where the angle $\theta_4$ is measured from the axis 308 relative to the first end 304. The fifth portion 348 of the gas may be directed at an angle $\theta_5$ (e.g., by distal surface 336 of the fifth port 330 with respect to the first end 304) by the fifth port 330 where the angle $\theta_5$ is also measured from the axis 308 relative to the first end 304. Furthermore, the sixth portion 350 of the gas may be directed at an angle $\theta_6$ (e.g., by distal surface 338 of the sixth port 332 with respect to the first end 304) by the sixth port 332 where the angle $\theta_6$ is also measured from the axis 308 relative to the first end 304. As above, in some embodiments, the angle $\theta_4$ may be greater than each of angle $\theta_5$ and $\theta_6$, and $\theta_4$ may be greater than approximately 90 degrees or may be substantially perpendicular. In some embodiments, the angle $\theta_4$ may be less than 90 degrees.

With reference to the embodiments of FIGS. 3-9, in some embodiments, the ports (e.g., ports 214, 216, 218, 228, 230, 232) may be substantially centered circumferentially relative to the axis such that the ports are each bilaterally symmetrical relative to a radius of the muzzle brake, and the collective ports are radially symmetrical about the muzzle brake. With reference to the embodiments of FIGS. 10-14, in some embodiments, the ports (e.g., ports 314, 316, 318, 328, 330, 332) may be individually and/or collectively asymmetrical. For example, with reference to FIG. 13, the first port 314 terminates at a location on the external surface 312 of the muzzle brake 300 that is bilaterally symmetrical and aligned with the radius and axis 308, while the second port 316 and third port 318 are cut at a circumferential angle relative to the radius (e.g., in the orientation of FIG. 13, the milling bit would be oriented slightly downwardly). As a result, the depicted second port 316 and third port 318 are oriented both rearwardly towards the first port 314 and slightly upwardly relative to the orientation of FIG. 13. The corresponding fifth and sixth ports (if any) or any corresponding ports may likewise be cut in substantially the same absolute direction (e.g., the upward angle of FIG. 13 may be mirrored on both sides) such that the net gas flow from the muzzle brake is not symmetrical within the plane perpendicular axis (e.g., a net downward force would be applied in the embodiment of FIG. 13). With reference to FIG. 14, in the depicted embodiment, the second port 316 and fifth port 330 are each cut with at least two bit movements along different axes, such that the portion of the ports 316, 330 closest to the openings 310 are longer (e.g., extend over a greater distance along the axis 308) than the corresponding opening at the external surface 312. In some embodiments, the opening at the external surface 312 for the second port 316 and fifth port 330 may be the same as or different than the opening at the external surface for the third port 318 and sixth port 332.

In various embodiments, each of the muzzle brake embodiments of the present disclosure may include a third set of ports arranged in an axial row. In an instance in which the first set of ports includes the first port and the second port and the second set of ports includes the fourth port and the fifth port the third set of ports may include a sixth port extending from the channel to the exterior surface of the body and a seventh port extending from the channel to the exterior surface of the body. In such an embodiment, the first set of ports may be positioned in the body such that the circumferential distance between the first set of ports and the second set of ports is the same as the circumferential distance between the first set of ports and the third set of ports and between the second set of ports and the third set of ports (e.g., each set of ports is equally distanced around the body). In some embodiments, the axial rows of ports may be differently spaced as described above. As above, the fourth port may be configured to direct a fourth portion of the gas from the channel to the external environment of the muzzle brake that at least partially disrupts a fifth portion of the gas directed by the fifth port from the channel to the external environment of the muzzle brake. The sixth port may be configured to direct a sixth portion of the gas from the channel to the external environment of the muzzle brake that at least partially disrupts a seventh portion of the gas directed by the seventh port from the channel to the external environment of the muzzle brake.

Method of Manufacturing

With reference to FIG. 15, an example method of manufacturing 500 a muzzle brake of the present disclosure is illustrated. As shown, the method 500 may include providing a body at operation 502. As described above, the body of the muzzle brake may be formed as a single, integral body (e.g., formed of a single piece of material) while in other embodiments, the body may be formed of a plurality of connected or assembled parts or elements. In any embodiment, providing the body at operation 502 may include providing a body formed of steel, stainless steel (e.g., 17-4 stainless steel, 416 stainless steel, etc.), steels alloys (e.g., 4340 steel, steel, etc.), aluminum, polymers, composites, nickel-chromium alloys (e.g. Inconel®), or any material suitable for use in firearms. The body may define a first end, a second end opposite the first end, and an axis extended therethrough as described above with reference to FIGS. 3-9 and FIGS. 10-14.

At operation 504, the method 500 may include removing material from the body to define one or more openings to form a channel. As described above, the one or more openings may be aligned along the axis so as to form a channel through which a projectile from a firearm may travel. The one or more openings may be dimensioned (e.g., size and shaped) to receive the projectile therethrough and permit the projectile to travel along the axis from the first end to the second end. In various embodiments, the dimensions of the one or more openings may be based, at least in part, on corresponding dimensions of the projectile fired by the firearm. As such, the removing of material to define one or more openings to form a channel may include drilling a hole along the axis defined between the first end and the second end of the body at a dimension associated with a particular round of the firearm. The material may be removed, for example, by milling, drilling, Electrical Discharge Machining (EDM), cutting, grinding, reaming, or by any other method known in the art. The EDM processes may include without limitation one or more of die-sinking or ram EDM, wire or wire cutting EDM, or other electrical discharge methods known in the art.

As shown in operation 506, the method 500 may include removing material from the body define a first port extending from the channel to an exterior surface of the body. As described above, the first port may include at least a portion of a surface that defines an angle with respect to the axis that is greater than an angle with respect to the axis defined by at least a portion of a surface of a second port. In some embodiments, the angle of the first port may be substantially perpendicular to the axis of the muzzle brake. As such, the method 500 may, via a milling machine or the like, orient a bit at the angle associated with the first port with respect to the body and translate the bit inwards along the angle so as to form the first port in the body at the associated angle. The bit may define the port's length, at least with respect to the outer surface of the muzzle brake. The bit may be moved side-to-side perpendicular to the axis to cut the port's width. In some embodiments, such as with the second port 316 and fifth port 330 shown in FIG. 14, two cuts may be made at different angles through substantially the same opening in the body to define a port having a larger internal volume. In various embodiments, while cutting the width, the bit may remain at the angle of the port. In some embodiments, the bit may translate on Cartesian coordinate axes (e.g., without regard to the cylindrical shape of the muzzle brake). In embodiments having one or more ports offset relative to the centerline of the muzzle brake (e.g., as shown in the embodiments of FIGS. 10-14), the body may be cut by a similarly offset bit.

In some embodiments in which a corresponding forth port is axially aligned with the first port on an opposing side of the exterior surface of the body and the angle of at least a port of the surface for the first port and the fourth ports (e.g., the respective distal surfaces for the first port and the fourth port with respect to the first end) are substantially perpendicular with respect to the axis, a milling machine or drill my insert a bit through the body at the axial location associate with the first port to form both the first port and the second port. Similar to operation 504, the removing of material to from the first port may be completed, for example, by milling, drilling, Electrical Discharge Machining (EDM), cutting, grinding, reaming, or by any other method known in the art. The EDM processes may include without limitation one or more of die-sinking or ram EDM, wire or wire cutting EDM, or other electrical discharge methods known in the art. Similar steps may be carried out for any of the ports formed as part of the muzzle brake embodiments described herein.

As shown in operation 508, the method 500 may include removing material from the body define a second port extending from the channel to an exterior surface of the body. As described above, the second port may include at least a portion of a surface that defines an angle with respect to the axis that is less than an angle with respect to the axis defined by at least a portion of a surface of the first port when measured relative to the axis of the muzzle brake from the direction of the first end. As such, the method 500 may, via a milling machine or the like, move a bit at the angle associated with the second port with respect to the body so as to form the second port in the body at the associated angle. Subsequent ports may similarly be formed at respective angles with bits having corresponding angles. Similar to operations 504 and 506, the removing of material to form the second port may be completed, for example, by milling, drilling, Electrical Discharge Machining (EDM), cutting, grinding, reaming, or by any other method known in the art. The EDM processes may include without limitation one or more of die-sinking or ram EDM, wire or wire cutting EDM, or other electrical discharge methods known in the art. Although operations 504-508 are described as occurring sequentially, the present disclosure contemplates that one or more of these operations may occur simultaneously and/or one or more operations may occur in a different order (e.g., the second port may be formed prior to the first port). During movement of the muzzle brake, the bits and/or muzzle brake body may be rotated and/or translated to properly orient the bit relative to the body. In some embodiments, any individual port may be formed in substantially the orientation and position shown in the figures.

The embodiments described herein may also be scalable to accommodate at least the aforementioned applications. Various components of embodiments described herein can be added, removed, reorganized, modified, duplicated, and/or the like as one skilled in the art would find convenient and/or necessary to implement a particular application in conjunction with the teachings of the present disclosure. In various embodiments, the order of operations in machining the brake may be modified, as long as the internal threads on the brake and the projectile channel are coaxial to prevent the bullet from striking the brake. In some embodiments, the coaxial relationship may be maintained by machining each of the coaxial portions in the same operation. Moreover, specialized features, characteristics, materials, components, and/or equipment may be applied in conjunction with the teachings of the present disclosure as one skilled in the art would find convenient and/or necessary to implement a particular application in light of the present disclosure. Furthermore, although described herein with reference to an example subtractive manufacturing process, the present disclosure contemplates that the muzzle brake embodiments described herein may also be formed, in whole or in part, via additive manufacturing processes and/or via a casting process.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A muzzle brake configured to attach to a muzzle end of a firearm, the muzzle brake comprising:
   a body defining:
      a first end;

a second end opposite the first end, wherein the muzzle brake is configured to engage the muzzle end of the firearm at or proximate the first end, the first end and the second end defining an axis extending therebetween;

one or more openings intersecting the axis to form a channel extending between the first end and the second end along the axis, wherein the channel is configured to receive a projectile from the firearm propelled therethrough by gas from a barrel of the firearm;

a first port extending from the channel to an exterior surface of the body;

a second port extending from the channel to the exterior surface of the body, wherein the second port is disposed between the first port and the second end, wherein, in operation, the first port is configured to direct a first portion of the gas from the channel to an external environment of the muzzle brake that at least partially disrupts a second portion of the gas directed by the second port from the channel to the external environment of the muzzle brake, and wherein a first angle at which the first portion of the gas exits the first port with respect to the axis and measured relative to the first end is closer to perpendicular to the axis than a second angle at which the second portion of the gas exits the second port with respect to the axis and measured relative to the first end.

2. The muzzle brake according to claim 1, wherein the angle at which the first portion of the gas exits the first port with respect to the axis and measured relative to the first end is greater than the angle at which the second portion of the gas exits the second port with respect to the axis and measured relative to the first end.

3. The muzzle brake according to claim 2, wherein the angle at which the first portion of the gas exits the first port is substantially perpendicular with respect to the axis.

4. The muzzle brake according to claim 2, wherein the angle at which the first portion of the gas exits the first port with respect to the axis is greater than approximately 90 degrees.

5. The muzzle brake according to claim 1, wherein the external surface of the body defines an at least partially cylindrical shape.

6. The muzzle brake according to claim 1, wherein a cross-sectional area of the first port at the exterior surface of the muzzle brake is smaller than a cross-sectional area of the second port at the exterior surface of the muzzle brake.

7. The muzzle brake according to claim 6, wherein the cross-sectional area of the first port and the second port at the exterior surface define a respective width measured in a circumferential direction perpendicular to the axis and a respective length measured in a longitudinal and axial direction parallel to the axis, wherein the length of the first port is less than the length of the second port.

8. The muzzle brake according to claim 1, further comprising a third port defined between the second port and the second end, the third port extending from the channel to the exterior surface of the body, wherein the first port is further configured to direct the first portion of the gas from the channel to the external environment of the muzzle brake so as to at least partially disrupt a third portion of the gas directed by the third port from the channel to the external environment of the muzzle brake.

9. The muzzle brake according to claim 8, wherein an angle at which the second portion of the gas exits the second port with respect to the axis is substantially the same as an angle at which the third portion of the gas exits the third port with respect to the axis.

10. The muzzle brake according to claim 8, wherein an angle at which the second portion of the gas exits the second port with respect to the axis differs from an angle at which the third portion of the gas exits the third port with respect to the axis.

11. The muzzle brake according to claim 1, wherein the first port and the second port form a first set of ports, the muzzle brake further comprising a second set of ports comprising:

a fourth port extending from the channel to the exterior surface of the body, the fourth port axially aligned with the first port on an opposing side of an exterior surface of the muzzle brake; and a fifth port extending from the channel to the exterior surface of the body, the fifth port axially aligned with the second port on an opposing side of the exterior surface of the muzzle brake.

12. The muzzle brake according to claim 11, wherein the fourth port is configured to direct a fourth portion of the gas from the channel to the external environment of the muzzle brake that at least partially disrupts a fifth portion of the gas directed by the fifth port from the channel to the external environment of the muzzle brake.

13. The muzzle brake according to claim 1, wherein the first port and the second port form a first set of ports, the muzzle brake further comprising:

a second set of ports comprising:
a fourth port extending from the channel to the exterior surface of the body; and
a fifth port extending from the channel to the exterior surface of the body; and a third set of ports comprising:
a sixth port extending from the channel to the exterior surface of the body; and
a seventh port extending from the channel to the exterior surface of the body.

14. The muzzle brake according to claim 13, wherein the fourth port is configured to direct a fourth portion of the gas from the channel to the external environment of the muzzle brake that at least partially disrupts a fifth portion of the gas directed by the fifth port from the channel to the external environment of the muzzle brake, and the sixth port is configured to direct a sixth portion of the gas from the channel to the external environment of the muzzle brake that at least partially disrupts a seventh portion of the gas directed by the seventh port from the channel to the external environment of the muzzle brake.

15. The muzzle brake according to claim 1, wherein at least a portion of a surface of the first port defines an angle with respect to the axis that is greater than an angle with respect to the axis defined by at least a portion of a surface of the second port.

16. The muzzle brake according to claim 1, further comprising a distal surface of the first port from the first end defining a first angle with respect to the axis and a distal surface of the second port from the first end defining a second angle with respect to the axis, wherein the first angle is greater than the second angle.

17. The muzzle brake according to claim 16, wherein the first angle is less than approximately 90 degrees with respect to the axis and measured relative to the first end.

18. A firearm comprising:
a barrel assembly comprising:

a barrel comprising an inner surface defining a bore configured to guide a projectile as the projectile is propelled by pressurized gas, the barrel defining:
   a muzzle end; and
   a chamber end opposite the muzzle end; and
the muzzle brake according to claim 1 attached to the barrel at the muzzle end.

19. A method of manufacturing at least a portion of a firearm muzzle brake, the method comprising:
   providing a body defining:
      a first end;
      a second end opposite the first end;
   removing material from the body to define one or more openings intersecting the axis to form a channel extending between the first end and the second end along the axis, wherein the channel is configured to receive a projectile from the firearm propelled therethrough by gas from a barrel of the firearm;
   removing material from the body to define a first port extending from the channel to an exterior surface of the body;
   removing material from the body between the first port and the second end to define a second port extending from the channel to the exterior surface of the body,
      wherein, in operation, the first port is configured to direct a first portion of the gas from the channel to an external environment of the muzzle brake that at least partially disrupts a second portion of the gas directed by the second port from the channel to the external environment of the muzzle brake,
   wherein muzzle brake is configured to engage the muzzle end of the firearm at or proximate the first end, the first end and the second end defining an axis extending therebetween, and
   wherein a first angle at which the first portion of the gas exits the first port with respect to the axis and measured relative to the first end is closer to perpendicular to the axis than a second angle at which the second portion of the gas exits the second port with respect to the axis and measured relative to the first end.

20. The method according to claim 19, further comprising removing material from the body with a milling machine cutting at the first angle relative the axis of the body to define the first port, and
   removing material from the body with the milling machine cutting at the second angle relative the axis of the body to define the second port, wherein the first angle is greater than the second angle with respect to the axis and measured relative to the first end.

* * * * *